United States Patent
Ono et al.

(10) Patent No.: US 9,602,797 B2
(45) Date of Patent: Mar. 21, 2017

(54) STEREOSCOPIC IMAGE PROCESSING APPARATUS, STEREOSCOPIC IMAGE PROCESSING METHOD, AND STEREOSCOPIC IMAGE PROCESSING PROGRAM

(71) Applicant: Panasonic Corporation, Osaka (JP)

(72) Inventors: Hiromichi Ono, Hyogo (JP); Haruo Yamashita, Osaka (JP); Yasuhiro Kuwahara, Osaka (JP); Takeshi Ito, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 428 days.

(21) Appl. No.: 14/220,599

(22) Filed: Mar. 20, 2014

(65) Prior Publication Data

US 2014/0205182 A1 Jul. 24, 2014

Related U.S. Application Data

(63) Continuation of application No. PCT/JP2012/007647, filed on Nov. 28, 2012.

(30) Foreign Application Priority Data

Nov. 30, 2011 (JP) .................. 2011-261406

(51) Int. Cl.
*H04N 13/00* (2006.01)
*H04N 13/02* (2006.01)

(52) U.S. Cl.
CPC ..... *H04N 13/0007* (2013.01); *H04N 13/0022* (2013.01); *H04N 13/0239* (2013.01)

(58) Field of Classification Search
CPC ........... H04N 13/0007; H04N 13/0022; H04N 13/0239
See application file for complete search history.

(56) References Cited

U.S. PATENT DOCUMENTS 7,679,641 B2   3/2010   Lipton et al.
8,369,607 B2   2/2013   Mashitani et al.
(Continued)

FOREIGN PATENT DOCUMENTS

JP    8-9421         1/1996
JP    2003-284095    10/2003
(Continued)

OTHER PUBLICATIONS

International Preliminary Report on Patentability and Written Opinion of the International Searching Authority issued Jun. 19, 2014 in International (PCT) Application No. PCT/JP2012/007647.
(Continued)

*Primary Examiner* — Edward Park
(74) *Attorney, Agent, or Firm* — Wenderoth, Lind & Ponack, L.L.P.

(57) ABSTRACT

An apparatus including: an acquiring unit operable to acquire a stereoscopic view image which includes a left eye image and a right eye image, the stereoscopic view image representing a stereoscopic image by means of parallax between the left eye image and the right eye image; an extracting unit operable to extract a subject region from the acquired stereoscopic view image, the subject region giving a stereoscopic image of a specific subject; a calculating unit operable to calculate a length of the extracted subject region in a parallax direction; and an image correcting unit operable to adjust parallax at an edge of the subject region based on the calculated length of the subject region in the parallax direction.

19 Claims, 22 Drawing Sheets

(56) References Cited

U.S. PATENT DOCUMENTS

| | | | |
|---|---|---|---|
| 2005/0089212 A1 | 4/2005 | Mashitani et al. | |
| 2005/0253924 A1 | 11/2005 | Mashitani | |
| 2007/0236560 A1* | 10/2007 | Lipton | H04N 13/0003 348/43 |
| 2008/0304013 A1* | 12/2008 | Seo | H04N 13/0459 353/8 |
| 2011/0069153 A1 | 3/2011 | Nakane | |
| 2013/0011048 A1 | 1/2013 | Yamashita et al. | |
| 2013/0027520 A1 | 1/2013 | Ono et al. | |

FOREIGN PATENT DOCUMENTS

| | | |
|---|---|---|
| JP | 2004-200973 | 7/2004 |
| JP | 2004-320189 | 11/2004 |
| JP | 2005-65162 | 3/2005 |
| JP | 2005-353047 | 12/2005 |
| JP | 2010-152521 | 7/2010 |
| JP | 2010-154422 | 7/2010 |
| WO | 2011/132404 | 10/2011 |
| WO | 2012/098608 | 7/2012 |

OTHER PUBLICATIONS

International Search Report issued Feb. 26, 2013 in International (PCT) Application No. PCT/JP2012/007647.

\* cited by examiner

Fig.21
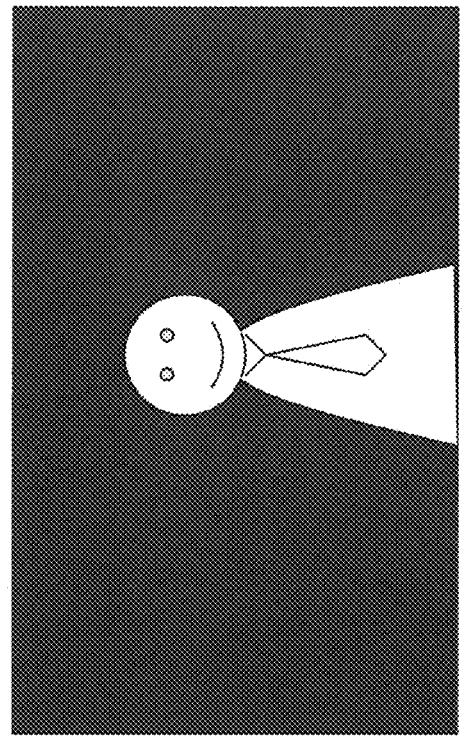
(a) FOREGROUND INFORMATION
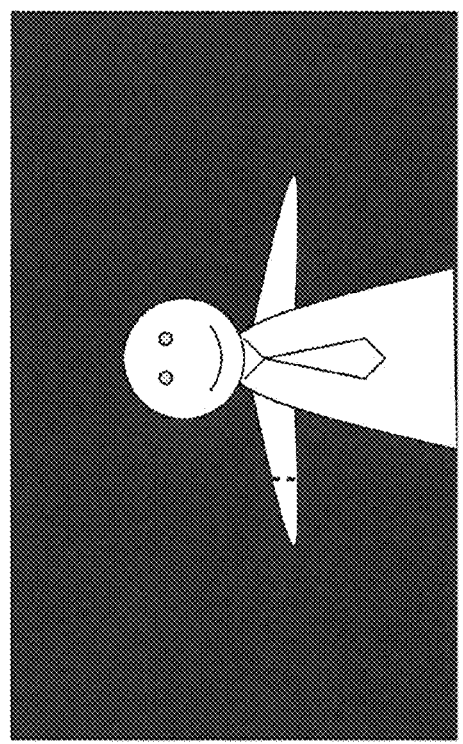
(b) FILTERED FOREGROUND INFOMATION

STEREOSCOPIC IMAGE PROCESSING APPARATUS, STEREOSCOPIC IMAGE PROCESSING METHOD, AND STEREOSCOPIC IMAGE PROCESSING PROGRAM

CROSS-REFERENCE TO RELATED APPLICATIONS

This is a continuation application of International Application No. PCT/JP2012/007647, with an international filing date of Nov. 28, 2012, which claims priority of Japanese Patent Application No. 2011-261406 filed on Nov. 30, 2011, the content of which is incorporated herein by reference.

BACKGROUND

1. Technical Field

The present disclosure relates to a stereoscopic image processing apparatus, a stereoscopic image processing method, and a stereoscopic image processing program which improve a visual quality of stereoscopic view images.

2. Related Art

A stereoscopic imaging apparatus configured to capture stereoscopic view images which are to be displayed on a display device (hereinafter, referred to as "stereoscopic display device") which projects stereoscopic view images including a left eye image and a right eye image on a left eye and a right eye of a viewer independently of each other has been known. The stereoscopic imaging apparatus captures the left eye image and the right eye image both of which reflect binocular disparity.

It has been known that since stereoscopic view images with excessive parallax both between distant view images (images of a subject in the distant view) and between close view images (images of a subject in the close view) exceed a fusion limit of a viewer in viewing the stereoscopic view images by using stereovision, the viewer cannot perceive the stereoscopic view images as a stereoscopic image or feels fatigue in viewing the stereoscopic view images even though he/she can perceive the images as a stereoscopic image.

The above described problem does not cause a big trouble in the case where the stereoscopic view images are displayed on a small-sized display device, but causes a serious trouble in such cases where the stereoscopic view images are displayed on a big display device and where a stereoscopic movie is screened.

In order to prevent generation of such stereoscopic view images of excessive parallax, a technique of reducing the parallax of the stereoscopic view images to be taken by performing processes including parallax adjustment and stereo base adjustment on stereoscopic view images to be recorded has been adopted (see JP H08-009421 A).

The parallax adjustment is a process used in the case where mainly the parallax of a distant view exceeds the fusion limit. In the parallax adjustment, as a result of nonlinear compression of a distance from the imaging apparatus to the distant view for the purpose of adjusting the parallax to be smaller, the distant view is virtually brought closer to the imaging apparatus. Consequently, the distant view that has been too far for human stereoscopic vision to work is brought closer so that the viewer can easily perceive the stereoscopic view images as a stereoscopic image.

The stereo base adjustment is a process of making a distance between the two imaging apparatuses (the imaging apparatus for taking left eye images and the imaging apparatus for taking right eye images) closer, i.e., setting the stereo base (base length) smaller. By performing the stereo base adjustment, a dynamic range of the parallax can be compressed. Therefore, by using the stereo base adjustment, stereoscopic view images which are from the close view to the distant view wholly contained within the fusion limit and allow the viewer to easily perceive them as a stereoscopic image can be acquired.

SUMMARY

However, in the parallax adjustment and the stereo base adjustment, stereoscopic view images which are easily perceived as a stereoscopic image are acquired as a result of taking account of the fusion limit for the stereovision and reducing the parallax between the original stereoscopic view images to bring the subject within the fusional area.

That is, the stereoscopic view images which have been subjected to the parallax adjustment and/or the stereo base adjustment are deteriorated in terms of natural-looking stereoscopic effects and natural perspective. In other words, the stereoscopic view images after the parallax adjustment and/or the stereo base adjustment tend to lack the stereoscopic effects and the perspective and to be perceived as an unnatural image.

Specifically, although stereoscopic view images which are easily perceived as a stereoscopic image are acquired through the parallax adjustment, a distance to the distant view is nonlinearly compressed. As a result, the stereoscopic view images which have been subjected to the parallax adjustment suffer a phenomenon of being perceived as a flat stereoscopic image without depth (a phenomenon in which a thickness of a subject in the distant view has decreased so that the images are perceived as a flat stereoscopic image).

On the other hand, since a technique of the stereo base adjustment compresses the dynamic range of the parallax of the stereoscopic view images to be acquired, the perspective decreases as a whole (a distance from the shortest point to the farthest point becomes shorter), causing a phenomenon in which the stereoscopic effects on individual subjects decrease.

It has been known that such compression and decrease of the stereoscopic effect involves a so-called cardboard phenomenon. In the cardboard phenomenon, a thickness of a main subject such as a person in the foreground decreases in the stereoscopic view images so that the subject appears as a flat picture painted on a board. The cardboard phenomenon also occurs in the cases where a subject has quite small roughness, where a subject is telephotographed, and where a subject is photographed under a specific lighting condition.

Stereoscopic view images with such a cardboard phenomenon strongly impress a viewer as an unnatural image and has the quality of stereoscopy largely degraded.

The present disclosure is made in view of the aforementioned problem and provides a stereoscopic image processing apparatus which make a cardboard phenomenon hardly occur.

One aspect of embodiments provides a stereoscopic image processing apparatus. The apparatus includes: an acquiring unit operable to acquire a stereoscopic view image which includes a left eye image and a right eye image, the stereoscopic view image representing a stereoscopic image by means of parallax between the left eye image and the right eye image; an extracting unit operable to extract a subject region from the acquired stereoscopic view image, the subject region giving a stereoscopic image of a specific subject; a calculating unit operable to calculate a length of the extracted subject region in a parallax direction; and an image correcting unit operable to adjust parallax at an edge of the subject region based on the calculated length of the subject region in the parallax direction.

According to the aspect, a natural stereoscopic effect is added to a stereoscopic view image so that the stereoscopic view image which hardly suffers a cardboard phenomenon can be acquired. These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 21 shows diagrams illustrating a progress of deleting regions which are short in vertical direction from foreground information, with (a) indicating the foreground information before having a median filter applied and (b) indicating the foreground information after having the median filter applied.

DETAILED DESCRIPTION

Embodiments will be described in detail below with reference to the drawings. However, unnecessarily detailed description may be omitted. For example, detailed description of an already known matter and repetition of substantially the same configuration may be omitted. Such omissions are for avoiding unnecessary redundancy in the following description to facilitate understanding by those skilled in the art.

The attached drawings and the following description are provided for those skilled in the art to fully understand the present disclosure and it is not intended to limit the subject described in the claims by the attached drawings and the following description.

<1. First Embodiment>
<Table of Contents>
1. First Embodiment
1.1. Configuration of a Stereoscopic Imaging Apparatus
1.2 Specific Configuration of the Region Extracting Unit
1.3 Specific Configuration of the Image Correcting Unit
1.4 Generation Process of the Depth Information
1.5 Binarization Process
1.6 Calculation Process of Breadth Information
1.7 Generation Process of the Parallax Signal
1.8 Coordinate Transformation Process
1.8.1 Extension Mode
1.8.2 Compression Mode
2. Second Embodiment
3. Third Embodiment
4. Fourth Embodiment
5. Effects and the Like
6. Other Embodiments <1.1. Configuration of a Stereoscopic Imaging Apparatus 100>

A configuration of a stereoscopic imaging apparatus (stereoscopic image processing apparatus) according to the present embodiment will be described below with reference to the drawings.

Figure 1:
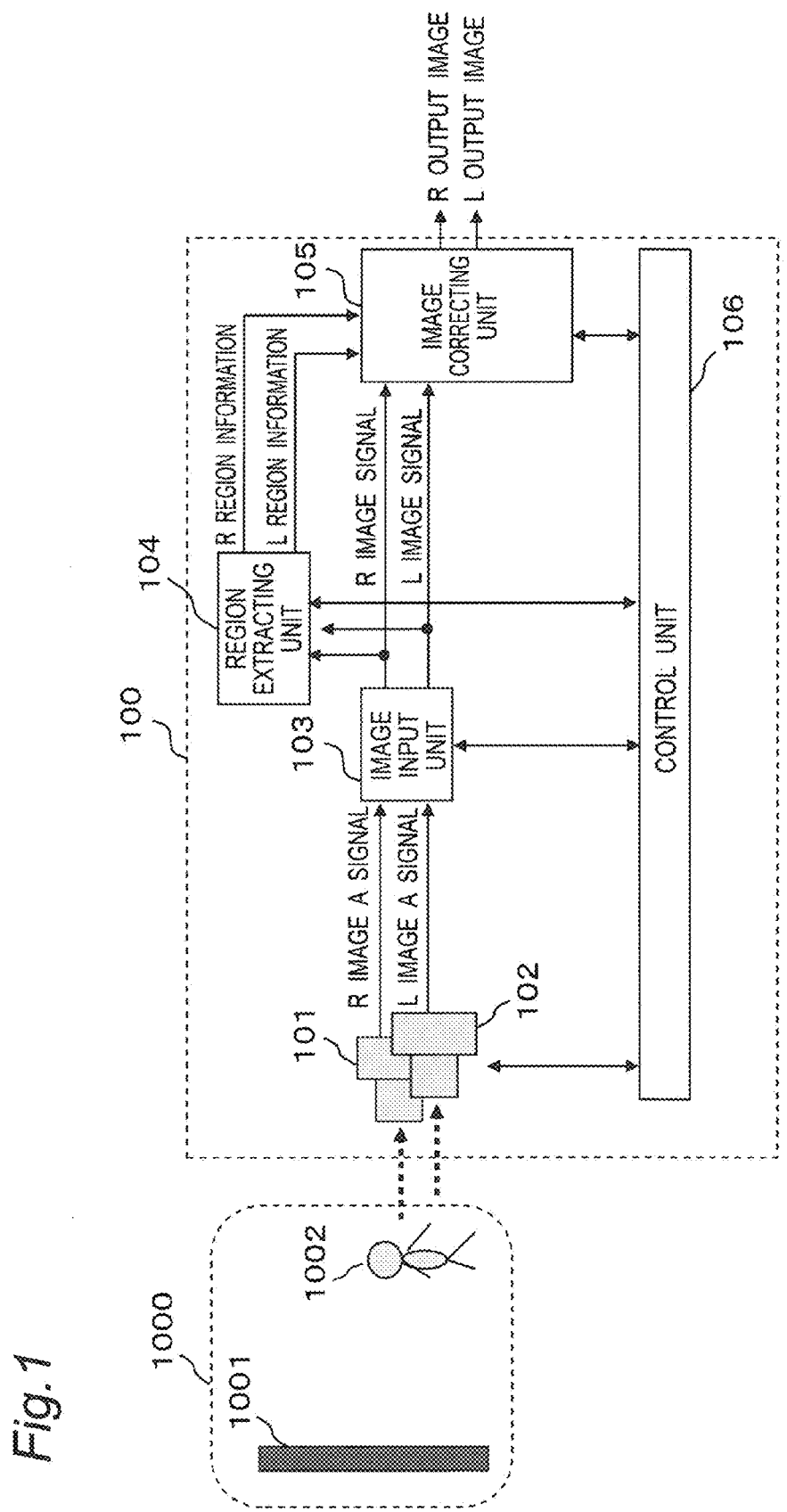
FIG. 1 is a block diagram schematically illustrating a stereoscopic imaging apparatus.

FIG. 1 is a block diagram illustrating an outline configuration of a stereoscopic imaging apparatus according to the present embodiment. FIG. 1 schematically illustrates a stereoscopic imaging apparatus 100 and a photographic scene 1000 captured by the stereoscopic imaging apparatus 100. As illustrated in FIG. 1, the stereoscopic imaging apparatus 100 includes a first imaging unit (an acquiring unit, an imaging unit) 101, a second imaging unit (an acquiring unit, an imaging unit) 102, an image input unit (an acquiring unit) 103, a region extracting unit (an extracting unit, a calculating unit) 104, an image correcting unit 105, and a control unit 106.

The first imaging unit 101 is an imaging apparatus installed in a predetermined first viewpoint position. The first imaging unit 101 includes an optical system for collecting subject light and an imaging device for acquiring analogue image signals for right eye (hereinafter, referred to as "R image A signals") by performing photoelectric conversion on the collected subject light. Then, the first imaging unit 101 outputs the acquired R image A signals to the image input unit 103.

The second imaging unit 102 is an imaging apparatus installed in a second viewpoint position located at a different site from the first viewpoint position. The second imaging unit 102 includes an optical system for collecting subject light and an imaging device for acquiring analogue image signals for left eye (hereinafter, referred to as "L image A signals") by performing photoelectric conversion on the collected subject light. Then, the second imaging unit 102 outputs the acquired L image A signals to the image input unit 103.

The image input unit 103 acquires the R image A signals acquired by the first imaging unit 101 and the L image A signals acquired by the second imaging unit 102. Further, the image input unit 103 performs A/D conversion on the acquired R image A signals and the L image A signals to acquire digital L image signals and digital R image signals, respectively. Then, the image input unit 103 outputs the L image signals and the R image signals to the region extracting unit 104 and the image correcting unit 105.

The region extracting unit 104 acquires the L image signals and the R image signals from the image input unit 103 and generates L region information, i.e., region information for the L image signals, and R region information, i.e., region information for the R image signals, from the acquired L image signals and R image signals. The region information will be described in detail later. Then, the region extracting unit 104 outputs the generated L region information and R region information to the image correcting unit 105.

The image correcting unit 105 acquires the L image signals and the R image signals output from the image input unit 103 and the L region information and the R region information output from the region extracting unit 104. Then, the image correcting unit 105 performs a correction process on the L image signals and the R image signals based on the L region information and the R region information. Then, the image correcting unit 105 outputs the L image signals and the R image signals after the correction process.

As illustrated in FIG. 1, the control unit 106 is connected with the first imaging unit 101, the second imaging unit 102, the image input unit 103, the region extracting unit 104, and the image correcting unit 105 to realize bidirectional exchange of necessary signals with these units. The control unit 106 controls the respective functional units of the stereoscopic imaging apparatus 100 by predetermined control signals (driving signals, synchronizing signals, etc.) to enable such processes as signal processing on the L image signals and the R image signals and a reading/writing process on data to be performed at predetermined timing.

<1.2 Specific Configuration of the Region Extracting Unit>

Now, a specific configuration of the region extracting unit 104 will be described with reference to the drawing.

Figure 2:
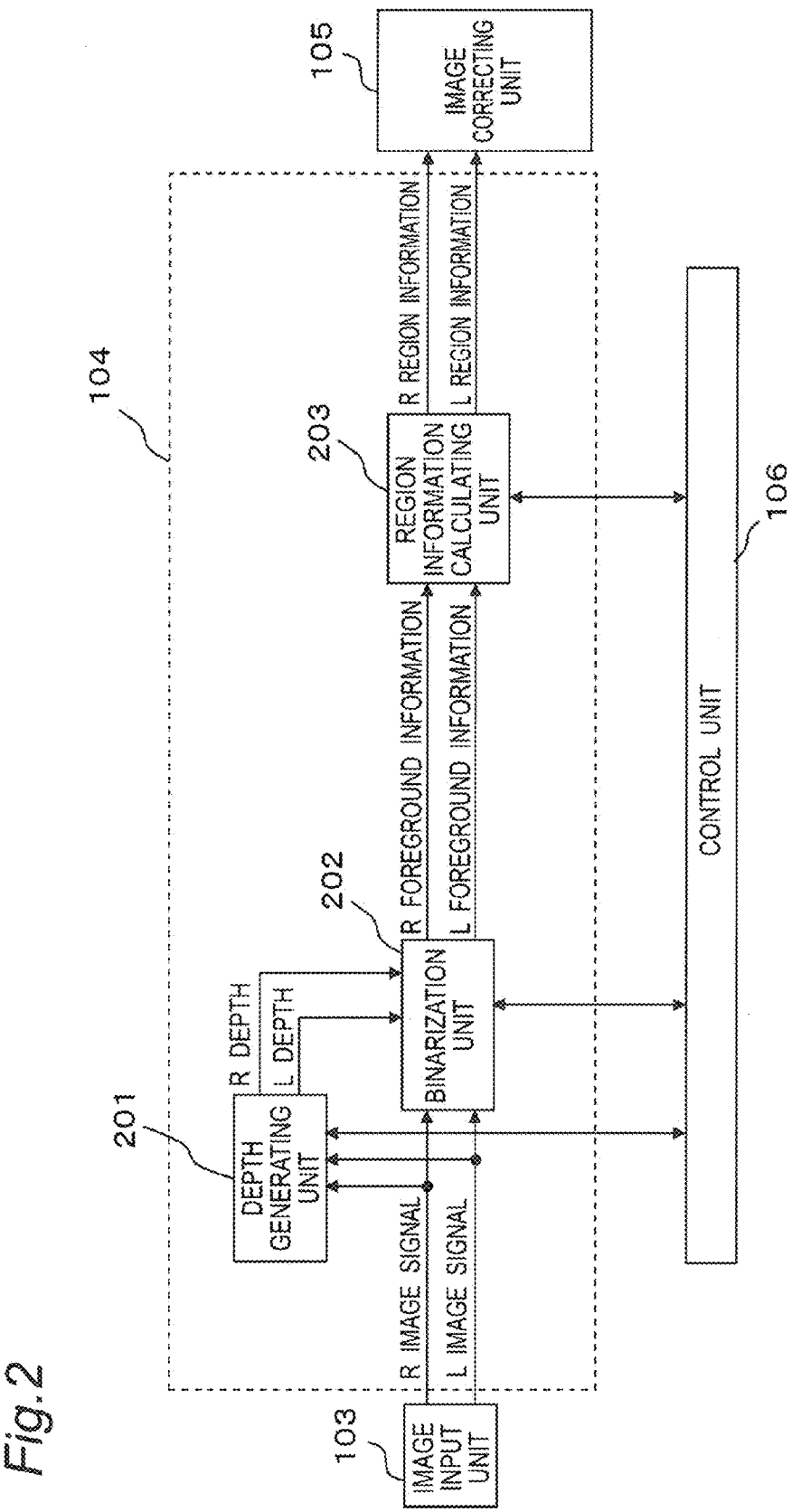
FIG. 2 is a block diagram illustrating a specific configuration of a region extracting unit.

FIG. 2 is a block diagram illustrating a specific configuration of a region extracting unit 104. As illustrated in FIG. 2, the region extracting unit 104 includes a depth generating unit (generating unit) 201, a binarization unit 202, and a region information calculating unit (calculating unit) 203.

The depth generating unit 201 acquires the L image signals and the R image signals from the image input unit 103. The depth generating unit 201 generates L depth information, i.e., depth information for the L image signals, and R depth information, i.e., depth information for the R image signals, from the L image signals and the R image signals. The depth information is image information generated on the basis of parallax calculated for each pixel of each image signal as a pixel value. Such generation of the depth information can be realized by parallax matching to be described later, for example.

The depth generating unit 201 outputs the generated L depth information and R depth information to the binarization unit 202.

The binarization unit 202 acquires the L image signals and the R image signals output from the image input unit 103 and the L depth information and the R depth information output from the depth generating unit 201. The binarization unit 202 binarizes the L image signals and the R image signals based on the L depth information and the R depth information to generate L foreground information and R foreground information. The binarization unit 202 outputs the generated L foreground information and R foreground information to the region information calculating unit 203.

The region information calculating unit 203 calculates width information and contour type information of foreground regions contained in the L foreground information and the R foreground information based on the L foreground information and the R foreground information acquired from the binarization unit 202. Then, the region information calculating unit 203 outputs the calculated width information and contour type information as the L region information and the R region information. Here, the L region information includes the width information and the contour type information calculated on the basis of the L foreground information. Also, the R region information includes the width information and the contour type information calculated on the basis of the R foreground information.

<1.3 Specific Configuration of the Image Correcting Unit>

Now, a specific configuration of the image correcting unit 105 will be described with reference to the drawings.

Figure 3:
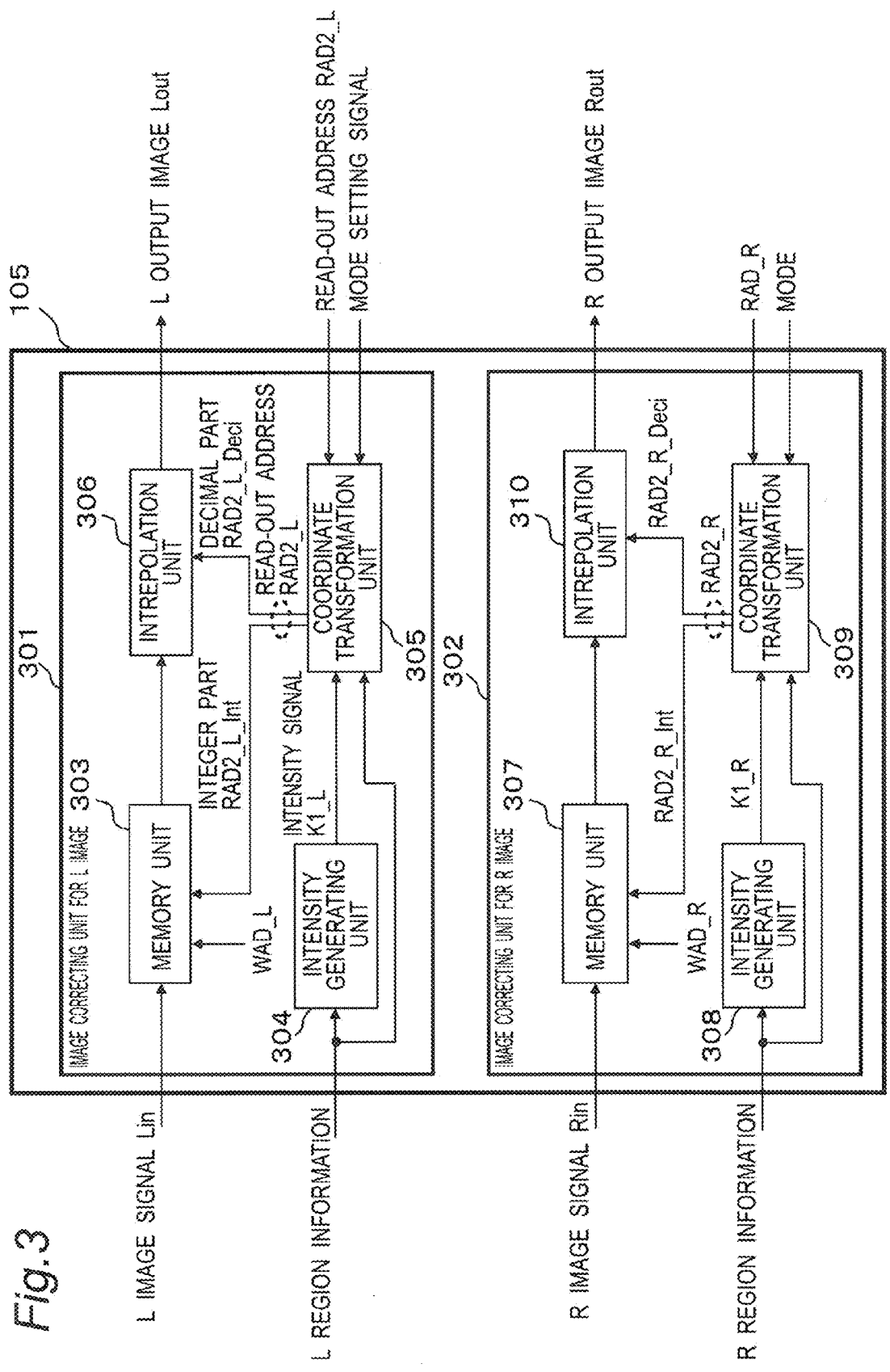
FIG. 3 is a block diagram illustrating a specific configuration of an image correcting unit.

As illustrated in FIG. 3, the image correcting unit 105 includes an image correcting unit for the L image signals 301 and an image correcting unit for the R image signals 302.

The image correcting unit 301 has a memory unit 303, an intensity generating unit 304, a coordinate transformation unit 305, and an interpolation unit 306. The memory unit 303 is a line memory, for example.

The intensity generating unit 304 acquires the L region information output from the region extracting unit 104. The intensity generating unit 304 generates intensity signals K1_L from the acquired L region information. The intensity generating unit 304 outputs the generated intensity signals K1_L to the coordinate transformation unit 305.

Figure 4:
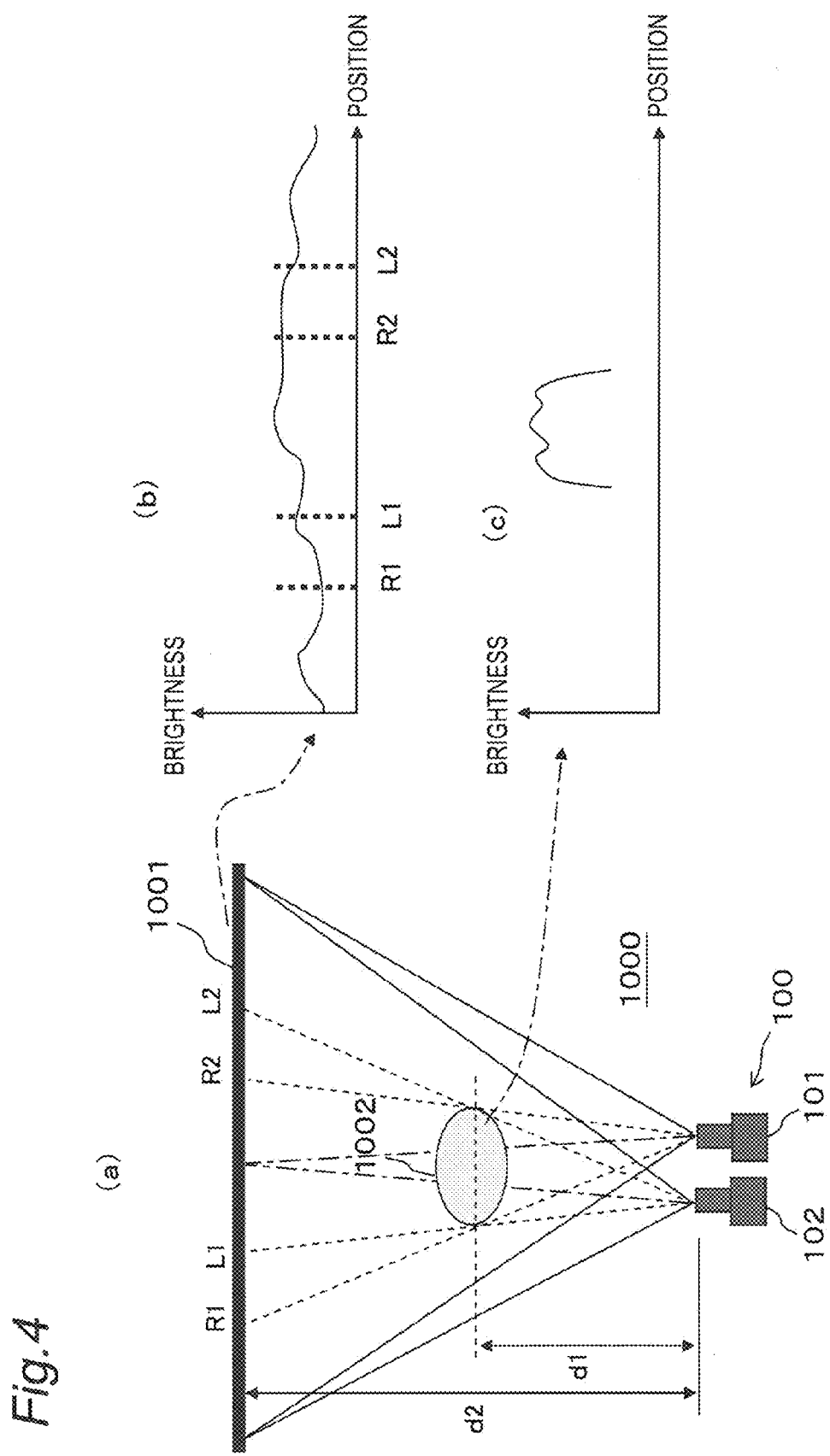
FIG. 4 shows diagrams schematically illustrating (exemplary) relationship between a photographic environment and a subject in a case where stereoscopic view images are taken by using the stereoscopic imaging apparatus.

Next, operation of the depth generating unit 201, the binarization unit 202, and the region information calculating unit 203 will be specifically described on the assumption that a subject illustrated in FIG. 4 is being captured.

FIG. 4 shows diagrams schematically illustrating an example of relationship between a photographic environment and a subject in a case where stereoscopic view images are taken by using the stereoscopic imaging apparatus 100. FIG. 4(a) is a diagram overlooking the photographic scene 1000 as well as the first imaging unit 101 and the second imaging unit 102 which are photographing the photographic scene 1000 from above. The photographic scene 1000 includes foreground 1002 (main subject) and background 1001 in positional relationship illustrated in FIG. 4(a).

In FIG. 4(a), an angle of convergence is set so that a center line of an angle of view captured by the first imaging unit 101 (an alternate long and short dash line from the first imaging unit 101) and a center line of an angle of view captured by the second imaging unit 102 (an alternate long and short dash line from the second imaging unit 102) of the stereoscopic imaging apparatus 100 cross each other at a distance (d2) at which the background 1001 is arranged. That is, the background 1001 is at a point of convergence.

For simplicity of description, the background 1001 is assumed to be something like a wall bearing a painting. However, the background 1001 is not limited to things of that kind and may be a subject such as a mountain, a building, or a person. On the other hand, in the case where the foreground 1002 is a three-dimensionally round object (an almost oval shaped object having a predetermined width as it is overlooked from above (for example, a person)), the present disclosure easily takes effect.

FIG. 4(b) shows brightness distribution of the painting on the background 1001. FIG. 4(c) shows brightness distribution on a front of the foreground 1002 viewed form the stereoscopic imaging apparatus 100. In FIGS. 4(b) and 4(c), abscissas indicate positions in the horizontal direction and ordinates indicate positions in the vertical direction.

<1.4 Generation Process of the Depth Information>

Figure 5:
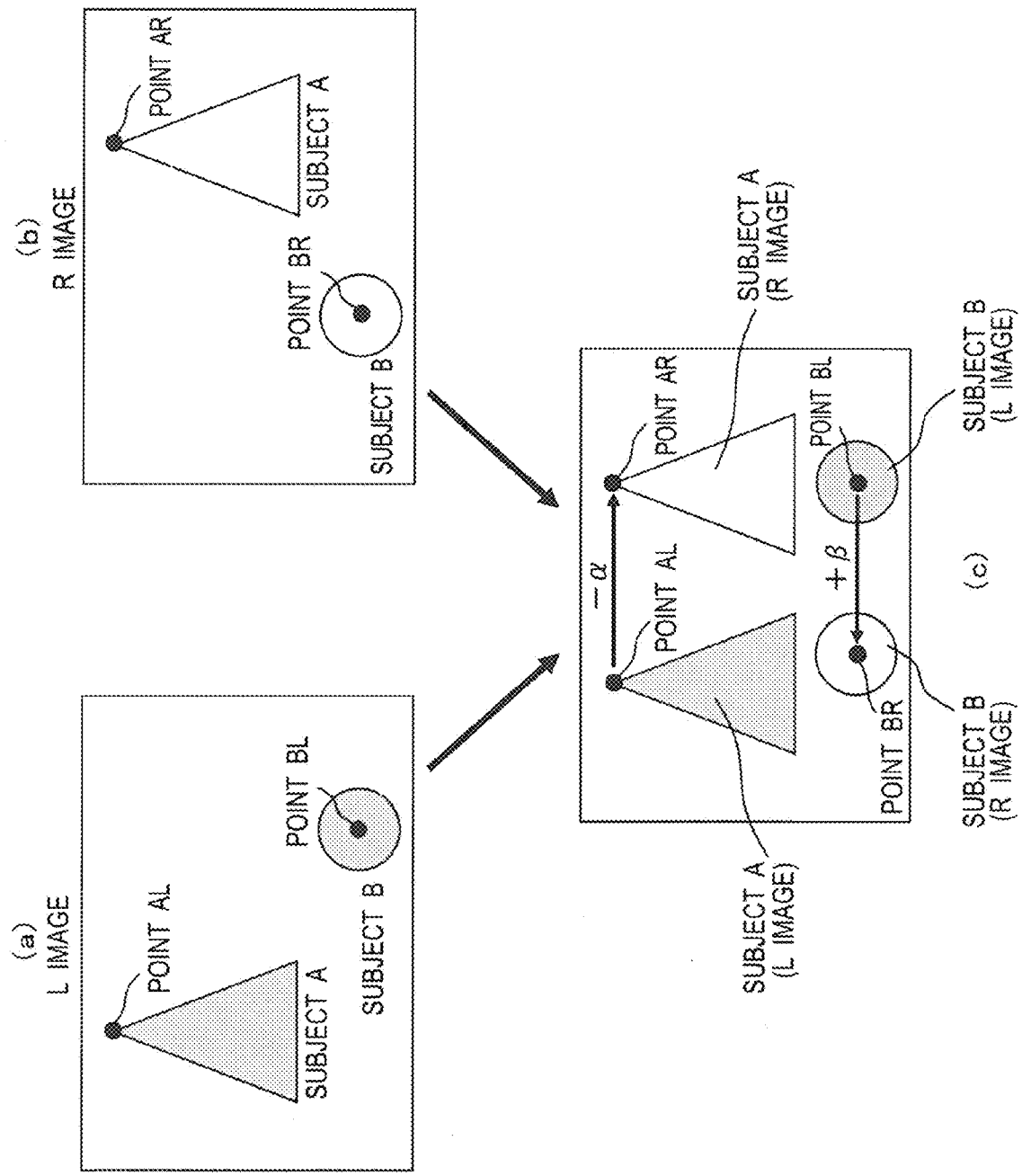
FIG. 5 shows diagrams for describing generation of depth information using parallax matching.

FIG. 5 shows diagrams for describing a generation process of the depth information by parallax matching. FIG. 5(a) is a diagram schematically illustrating an example of the L image signals. FIG. 5(b) is a diagram schematically illustrating an example of the R image signals. Further, FIG. 5(c) is a diagram displaying the L image signals and the R image signals of FIG. 5(a) and FIG. 5(b) overlapped each other as one image.

The depth generating unit 201 generates the depth information by performing (Process 1) to (Process 3) below, for example.

(Process 1)

First, the depth generating unit 201 detects, for example, that a point AL on a subject A in the L image signals of FIG. 5(a) (the top point of the triangle) corresponds to a point AR on the subject A in the image of FIG. 5(b) (the top point of the triangle) by comparing the L image signals with the R image signals.

(Process 2)

Then, the depth generating unit 201 calculates parallax Diff(A) based on an amount of disparity between the detected two corresponding points of the point AL and the point AR. Meanwhile, it is assumed that the parallax is marked with a positive or negative sign according to the direction of disparity. For example, it is assumed that the case where the point in the R image signals is away from the point in the L image signals to left is indicated by positive parallax and the case reverse to that is indicated by negative parallax.

For example, in the case of FIG. 5(c), it is assumed that the absolute value of parallax for the subject A is $\alpha$ ($\geq 0$). In that case, since the point AR in the R image signals is away from the point AL in the L image signals to right, the depth generating unit 201 calculates the parallax for the subject A as "$-\alpha$". In FIG. 5(c), it is assumed that the absolute value of parallax between a point BL and a point BR (center points of circles) on a subject B is $\beta$ ($\geq 0$). In that case, since the point BR in the R image signals is away from the point BL in the L image signals to left, the depth generating unit 201 calculates the parallax for the subject B as "$+\beta$".

(Process 3)

The depth generating unit 201 performs (Process 1) and (Process 2) on all points (all pixels) on the image to generate a parallax image (depth image) having the calculated parallaxes as its pixel values. That is, the depth generating unit 201 computes the L depth information from a parallax image which has been generated on the basis of the parallax calculated for each pixel of the L image signals as pixel values. Also, the depth generating unit 201 computes the R depth information from a parallax image which has been generated on the basis of the parallax calculated for each pixel of the R image signals as pixel values.

Based on the above described depth information, a depth map can be generated in which values correlated with distances between real positions corresponding to respective pixels of the subject (positions in the three-dimensional space) and a position of the stereoscopic imaging apparatus 100 are mapped to the respective pixels.

Meanwhile, the above described generating method of the L depth information and the R depth information is an example of depth information generating method without limitation. For example, when the parallax is determined, the parallax may be marked with a sign in the reverse manner. Further, the depth generating unit 201 may be adapted to generate the parallax image to acquire the L depth information and the R depth information in a method other than the parallax matching.

The above described depth information may be generated by a 2D image-3D image conversion process. The depth information may be generated by other image processing methods such as generation from blur (bokeh) information of the image. Further, the depth information may be generated on the basis of an actual range value measured by such a measuring instrument as a distance sensor. Further, at least a part of the depth information may be optionally specified by a user.

<1.5 Binarization Process>

Figure 6:
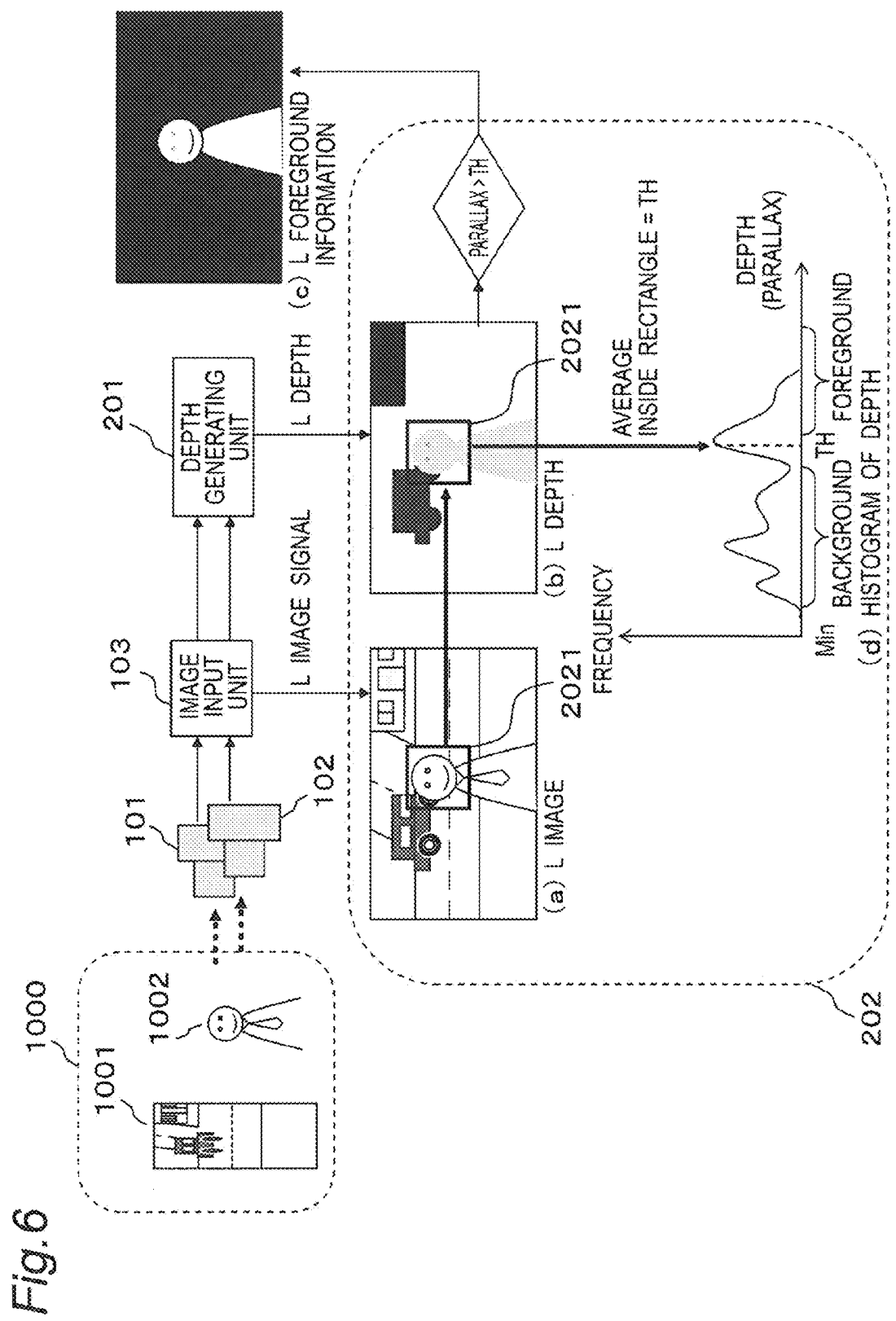
FIG. 6 is a diagram for describing a binarization process in a binarization unit.

FIG. 6 is a diagram for describing a binarization process in the binarization unit 202. In FIG. 6, stereoscopic view images of the photographic scene 1000 including the background 1001 and the foreground 1002 which have been captured by the stereoscopic imaging apparatus 100 are schematically illustrated. In FIG. 6, (a) is a diagram schematically illustrating the L image signals. In FIG. 6, (b) is a diagram schematically illustrating an L depth information image. In FIG. 6, (c) is a diagram schematically illustrating the L foreground information. In FIG. 6, (d) is a diagram schematically showing a histogram of depth (parallax) in the L depth information image.

The binarization unit 202 performs a binarization process on the L image signals and the R image signals based on (Process 1) to (Process 4) below.

(Process 1)

First, the binarization unit 202 performs a face detection process by using the L image signals to acquire a face region 2021 as a binarization region. For example, since the foreground 1002 of the photographic scene 1000 in FIG. 4 is a portrait, the binarization by the face detection process is effective. However, the detection technique of the binarization region needs not to be limited to be based on the face detection process and any technique may be adopted as far as it can adequately acquire a region of the main subject or the like. For example, a region on a display screen touched by a user may be used as the binarization region, or a focus point may be used as the binarization region. Alternatively, the binarization region may be decided based on a point of convergence (i.e., a point at which the depth (parallax) becomes zero) with (Process 2) below omitted (for example, TH=0).

(Process 2)

Next, as a threshold TH for the binarization process performed on regions other than the region which has been subjected to the binarization process in Process 1, an average depth (parallax) of the face region 2021 in the L depth information image is calculated.

(Process 3)

The binarization unit 202 generates the L foreground information (foreground information for the left eye image) based on the pixel values of all pixels on the L depth information image. The L foreground information takes the pixel value 1 in the case where a corresponding pixel value of the L depth information image exceeds the threshold TH, and takes the pixel value 0 in the case where a corresponding pixel value of the L depth information image is at the threshold TH or lower.

(Process 4)

The binarization unit 202 also performs the above described (Process 1) to (Process 3) for the R image (an image for the right eye) to generate the R foreground information (foreground information for the right eye image).

Meanwhile, in the (Process 2), the threshold TH may be set to a depth value of a subject closest to the stereoscopic imaging apparatus or may be set to a depth value of a person region detected by image recognition as described in the (Process 1), for example. Also, the threshold TH may be set to a value optionally specified by the user or may be set on the basis of a distance value to the subject measured by such a measuring instrument as a distance sensor. In the case where the user optionally sets the threshold TH, the above described (Process 2) to (Process 3) are repeated so that a change in the pixel values in the (Process 3) is shown on a display monitor or the like for the user to adjust the value of the threshold TH by confirming the pixel values. It is needless to say that an optional algorithm may be adopted for automatic decision of the threshold TH.

<1.6 Calculation Process of Breadth Information>

Now, a specific method of calculating the width (breadth) information will be described with reference to the drawing. Here, the width information is information about the number of pixels sequentially arrayed in the horizontal direction of the extracted foreground region. Specifically, the width information is a value indicating the width of the foreground region.

Figure 7:
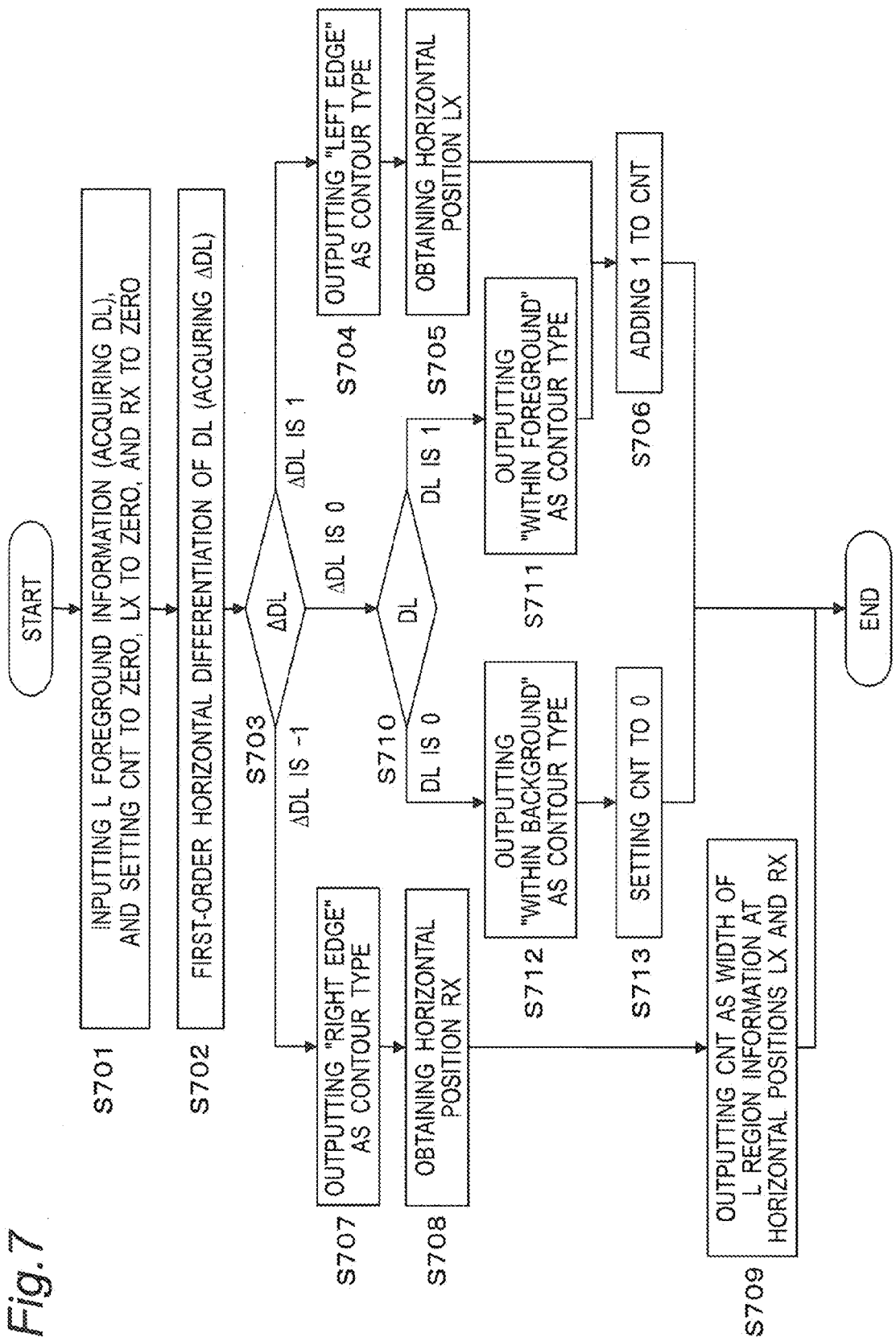
FIG. 7 is a flow chart showing operation of calculating width information.

FIG. 7 is a flow chart showing operation of calculating the width information.

The region information calculating unit 203 acquires a signal value DL(X) at a position X in the L foreground information output from the binarization unit 202 (S701). Then, the region information calculating unit 203 sets a calculated width value CNT to 0, a left edge horizontal position LX to 0, and a right edge horizontal position RX to 0. Here, it is assumed that the input L foreground information holds the pixel value 1 for the foreground and the pixel value 0 for the background.

The region information calculating unit 203 differentiates the L foreground information DL for the horizontal position (the value in the X axis direction) (S702). As a result, the region information calculating unit 203 acquires a differentiated signal of the L foreground information ΔDL. From the next process onward, it is assumed that ΔDL is determined by a difference value with an L foreground information signal DL(X+1) which is immediately to the right of the L foreground information signal DL(X) in the X axis direction as shown in the (Expression 1) below.

$$\Delta DL = DL(X+1) - DL(X) \qquad \text{(Expression 1)}$$

The region information calculating unit 203 selects one of the three processes below according to the value of the differentiated signal of the L foreground information ΔDL and performs the process (S703).

(in the Case that ΔDL is 1 in S703)

In the case that the value of the differentiated signal of the L foreground information ΔDL is 1 in S703, the region information calculating unit 203 outputs "left edge" information as the contour type information of the L region information (S704). Then, the region information calculating unit 203 substitutes a horizontal position X for the left edge horizontal position LX (S705). Further, the region information calculating unit 203 adds 1 to the calculated width value CNT (S706).

(in the Case that ΔDL is −1 in S703)

In the case that the value of the differentiated signal of the L foreground information ΔDL is −1 in S703, the region information calculating unit 203 outputs "right edge" information as the contour type information of the L region information (S707). Then, the region information calculating unit 203 substitutes the horizontal position X for the right edge horizontal position RX (S708). The region information calculating unit 203 outputs the calculated width value CNT as width information of the L region information in the left edge horizontal position LX and width information of the L region information in the right edge horizontal position RX (S709).

(In the case that ΔDL is 0 in S703)

In the case that the value of the differentiated signal of the L foreground information ΔDL is 0 in S703, the region information calculating unit 203 selects one of the two processes below according to the value of the L foreground information DL and performs the process (S710).

That is, in the case that the value of the L foreground information DL is 1 in S710, the region information calculating unit 203 outputs "within the foreground" information as the contour type information of the L region information (S711). Then, the region information calculating unit 203 proceeds to a process of S706.

On the other hand, in the case that the value of the L foreground information DL is 0 in S710, the region information calculating unit 203 outputs "within the background" information as the contour type information of the L region information (S712). Then, the region information calculating unit 203 resets the calculated width value CNT to 0 (S713).

Figure 8:
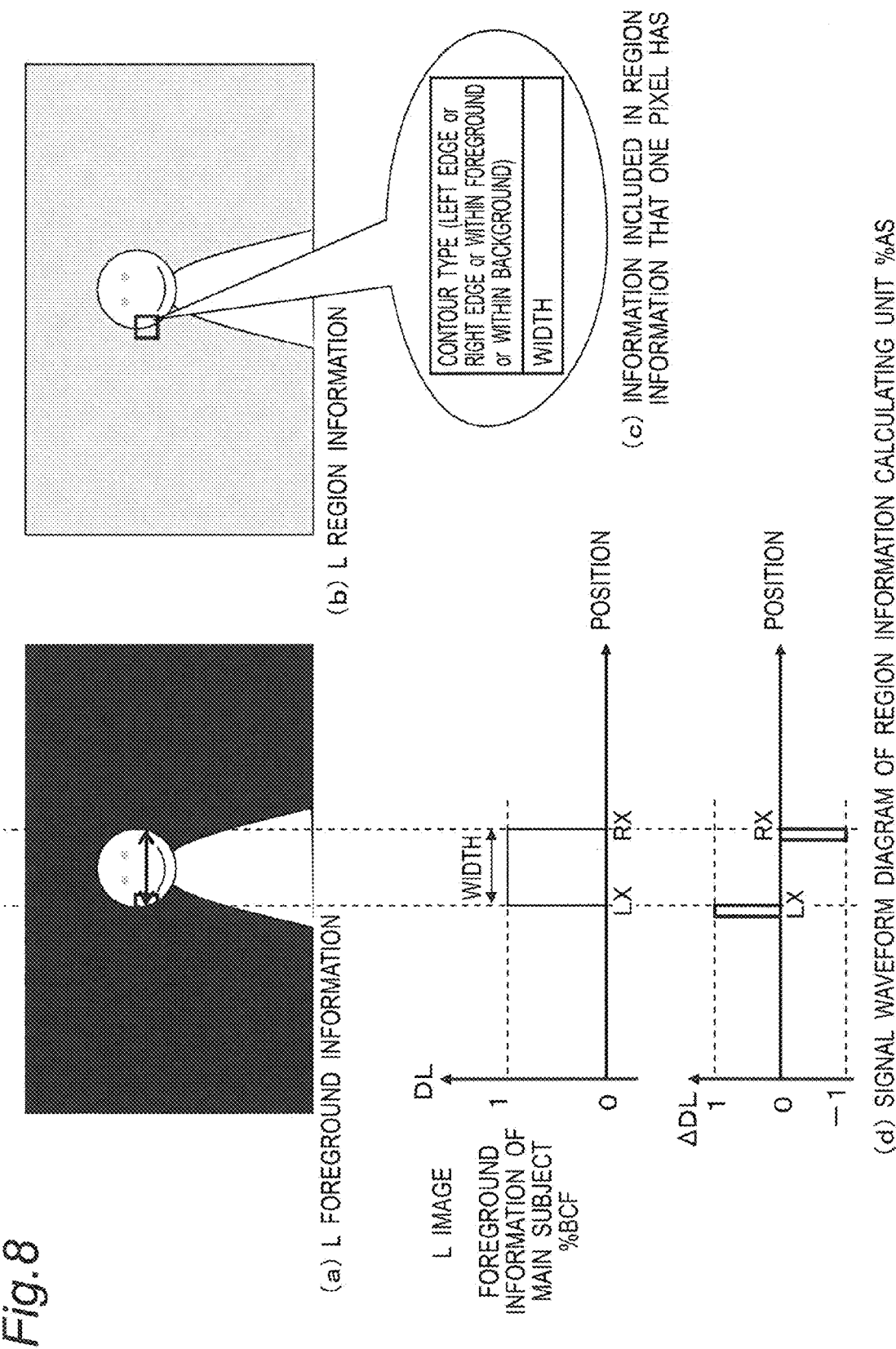
FIG. 8 shows diagrams for describing contour type information.

Now, the contour type information will be described in detail. FIG. 8 shows schematic diagrams for describing the contour type information. FIG. 8(a) is a diagram schematically illustrating the L foreground information output from the binarization unit 202 when the stereoscopic view images of the photographic scene 1000 containing the background 1001 and the foreground 1002 are captured by the stereoscopic imaging apparatus 100 (see FIG. 5). FIG. 8(b) is a diagram schematically illustrating the L region information corresponding to the L foreground information of FIG. 8(a). FIG. 8(c) is a diagram schematically illustrating information held by a pixel of the L region information. FIG. 8(d) is a signal waveform diagram of the region information calculating unit 203 with the abscissa indicating the positions in the horizontal direction and the ordinate indicating the values of the L foreground information. Here, DL in FIG.

8(d) represents the foreground information of the L image for a pixel position in the L image given by the binarization unit 202.

The L region information and the R region information of the captured image hold, for example, the width information and the contour type information for each pixel as in FIG. 8(c).

As the width information, the foreground length continuous in the horizontal direction (in the X axis direction) of the L foreground information and the R foreground information is held.

The contour type information of the respective pixels of the L foreground information and the R foreground information in the positions at the border between the foreground region and the background region and also immediately left to the background region indicates the "left edge" information. The contour type information of the respective pixels of the L foreground information and the R foreground information in the positions at the border between the foreground region and the background region and also immediately left to the background region indicates the "right edge" information. Further, the contour type information of the respective pixels of the L foreground information and the R foreground information in the positions within the foreground region other than at the border between the foreground region and the background region indicates the "within the foreground" information. Also, the contour type information of the respective pixels of the L foreground information and the R foreground information in the positions within the background region other than at the border between the foreground region and the background region indicates the "within the background" information.

Although the above description takes an example of calculating the width information by summing the calculated width value CNT, the width information may be calculated directly from the values of the left edge horizontal position LX and the right edge horizontal position RX.

The width information may be represented by the number of serial pixels as in the above description or may be represented by using the value related with the real length. Any representation method may be adopted as far as it provides the information which can identify the length in the horizontal direction, i.e., an ordinary parallax direction of the foreground region.

<1.7 Generation Process of the Parallax Signal>

Figure 9:
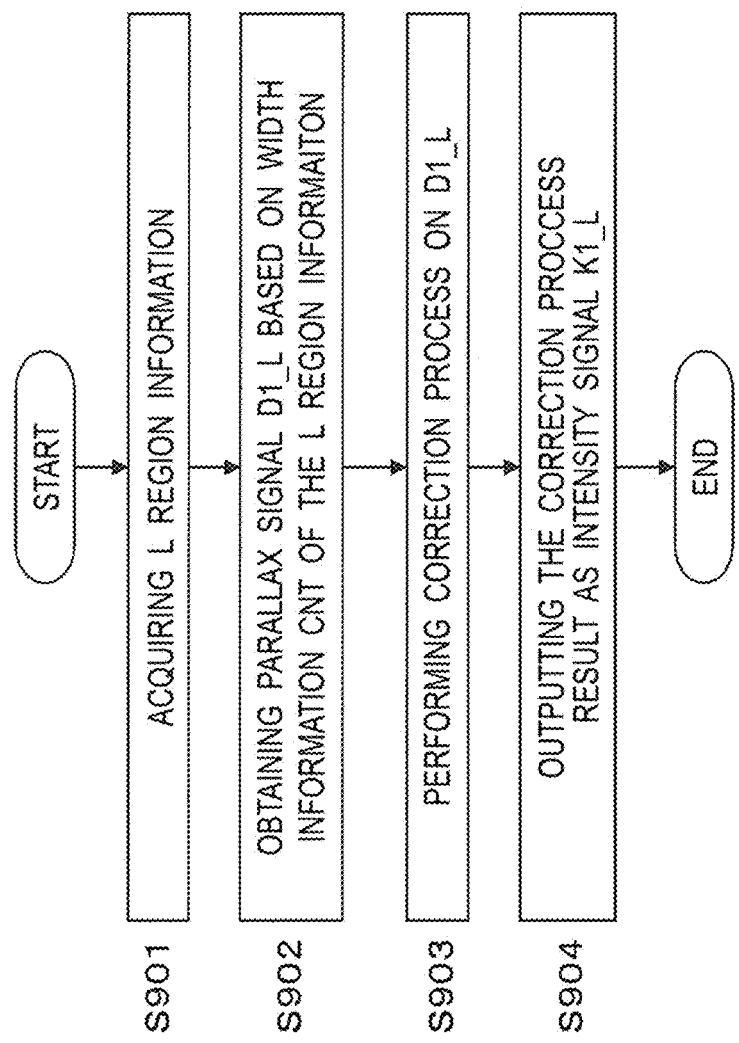
FIG. 9 is a flow chart showing operation of an intensity generating unit.

FIG. 9 is a flow chart showing specific operation of the intensity generating unit 304.

First, the intensity generating unit 304 acquires the L region information output from the region information calculating unit 203 (S901).

Next, the intensity generating unit 304 outputs a parallax signal for the L image D1_L by using the width information CNT included in the input L region information (S902).

Figure 10:
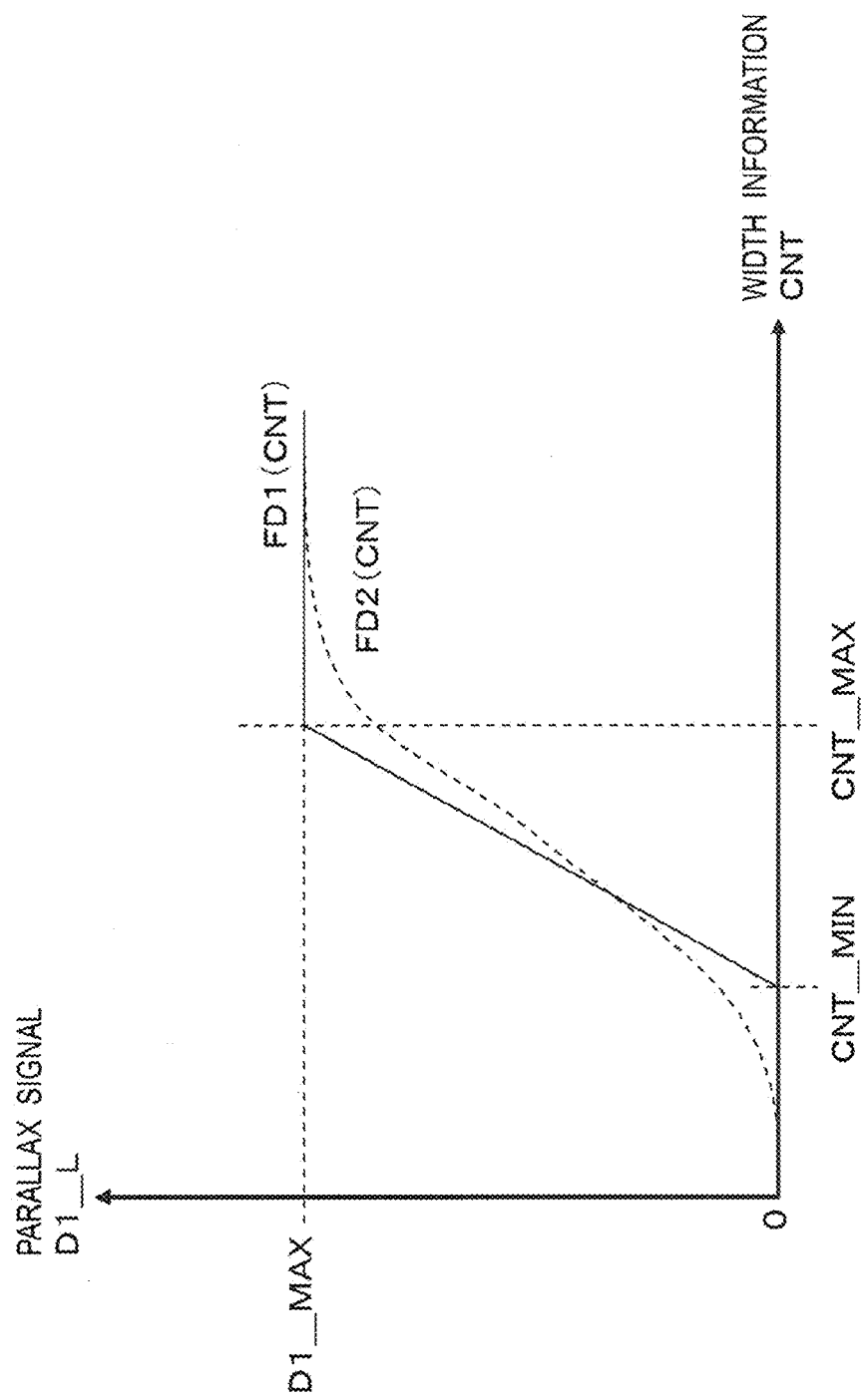
FIG. 10 is a relationship diagram with an abscissa indicating the values of width information of a foreground region for a left eye image and an ordinate indicating the values of parallax signal.

On this occasion, the intensity generating unit 304 generates the parallax signal D1_L from the width information CNT based on, for example, a function FD1 (CNT) shown by a solid line in FIG. 10 so that the parallax signal D1_L increases as the width information CNT increases. FIG. 10 is a relationship diagram with the abscissa indicating the values of width information CNT of the foreground region for the L image and the ordinate indicating the values of the parallax signal D1 L. In FIG. 10, D1_MAX represents the maximum value of the parallax signal D1_L to be output, CNT_MIN represents the minimum value of the width information required to output the parallax signal D1_L for the input width information CNT, and CNT_MAX represents the maximum value of the width information for outputting the maximum value D1_MAX of the parallax signal D1 L.

Also, the intensity generating unit 304 may generate the parallax signal D1_L from the width information CNT based on a sigmoid function FD2 (CNT) shown by a dotted line in FIG. 10 in place of the function FD1 (CNT). The intensity generating unit 304 can use any transform function whether the function is represented by a straight line or a curved line as far as the function increases the parallax signal D1_L as the width information CNT increases, i.e., the function is a monotonically increasing function. Further, the intensity generating unit 304 may provide a predetermined upper limit so as not to excessively increase the parallax signal D1_L.

Next, the intensity generating unit 304 performs a correction process (for example, a low-pass filtering process) on the parallax signal D1_L (S903).

Figure 11:
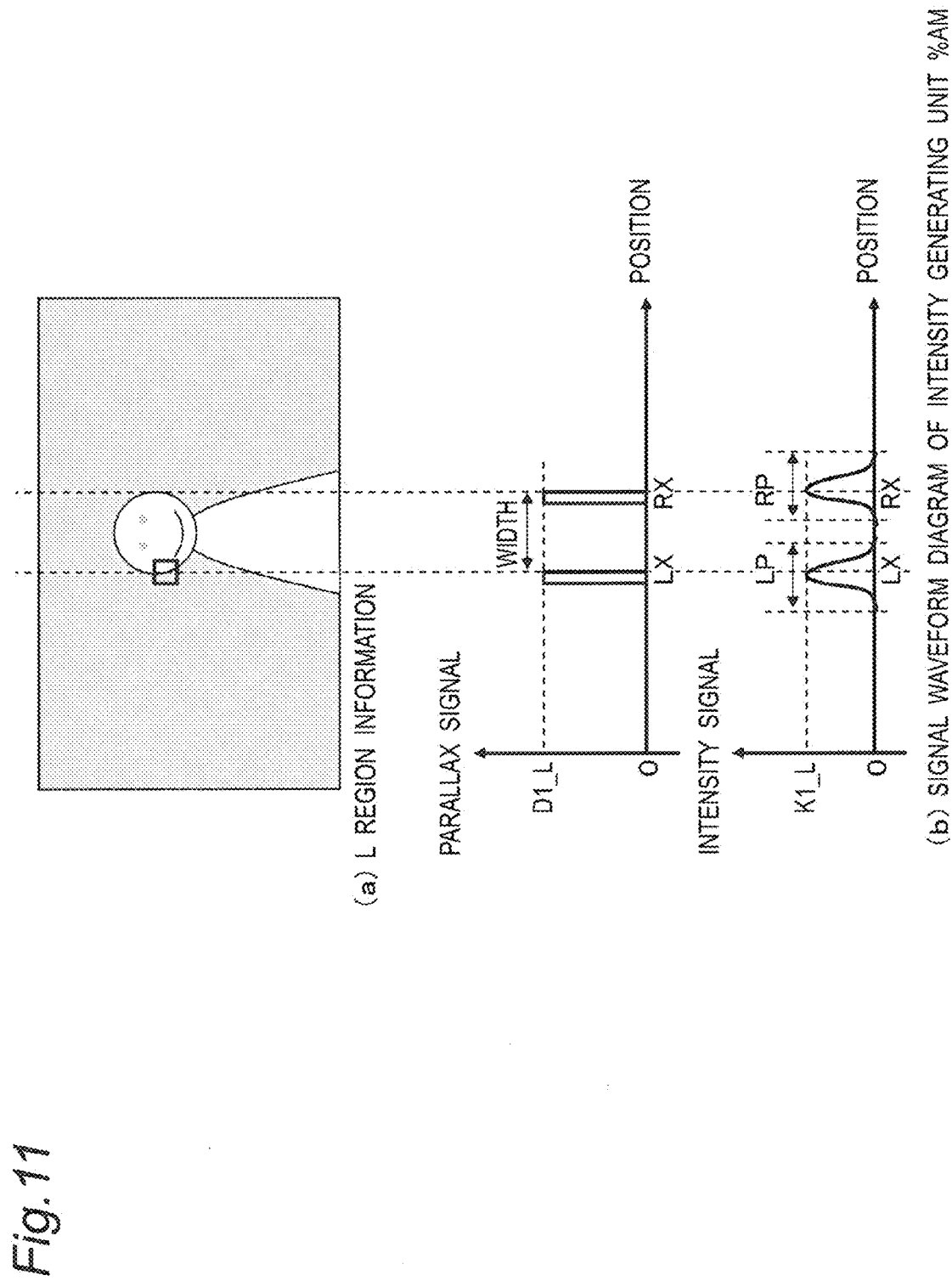
FIG. 11 shows diagrams for describing operation of a correcting process on the parallax signal.

FIG. 11 shows diagrams for describing a low-pass filtering process performed on the parallax signal D1_L. FIG. 11(a) is a diagram schematically illustrating the L region information (the region information for the left eye) when the stereoscopic view images of the photographic scene 1000 are captured by the stereoscopic imaging apparatus 100 (see FIG. 4). In FIG. 11(b), the abscissa indicates the positions in the horizontal direction and the ordinate indicates the values of the parallax signal acquired on the basis of the L region information and the intensity signal to be output. That is, K1_L in FIG. 11(b) represents the intensity signal K1_L to be input to the coordinate transformation unit 305. In FIG. 11(b), LX and RX represent the left edge and the right edge of the main subject 1002 respectively, and LP and RP represent the regions in which the intensity signal K1_L to be output has values.

Next, the intensity generating unit 304 outputs the parallax signal D1_L which has been subjected to the correction process to the coordinate transformation unit 305 as the intensity signal for the L image K1_L (S904).

In the above described manner, the intensity signal for the L image K1_L can be generated by the intensity generating unit 304. Although the operation of the intensity generating unit 304 generating the intensity signal for the L image K1_L based on the L region information has been described above, an intensity signal for the R image K1_R may be calculated in the same manner.

<1.8 Coordinate Transformation Process>

The coordinate transformation unit 305 acquires the intensity signal K1_L output from the intensity generating unit 304, the L region information output from the region extracting unit 104, and a read-out address RAD_L and a mode setting signal output from the control unit 106. The mode setting signal is for setting a mode of correction process method by the image correcting unit 105.

Modes to be set by the mode setting signal include, for example, two modes of "extension mode" for selecting extension of the left edge of a subject on the L image and extension of the right edge of the same subject on the R image and "compression mode" for selecting compression of the right edge of a subject on the L image and compression of the left edge of the same subject on the R image. Details of the modes will be described later.

The coordinate transformation unit 305 transforms the read-out address RAD_L into a read-out address RAD2_L based on the L region information and the intensity signal K1_L to enable the mode specified by the mode setting signal to be performed. Then, the coordinate transformation unit 305 outputs an integer part RAD_L_Int of the read-out address RAD2_L after the transformation to the memory unit 303 and outputs a decimal part RAD2_L_Deci of the read-out address RAD2_L after the transformation to the interpolation unit 306.

The interpolation unit 306 acquires the L image signals output from the memory unit 303 and the decimal part RAD2_L_Deci of the read-out address RAD2_L output from the coordinate transformation unit 305. Then, the interpolation unit 306 performs an interpolation process on the L image signals based on the read-out address (decimal part) RAD2_L_Deci. Subsequently, the interpolation unit 306 outputs the L image signals which have been subjected to the interpolation process as L image signals Lout.

Meanwhile, the image correcting unit for the R image signals 302 may have the same configuration as that of the image correcting unit 301. The image correcting unit 302 differs from the image correcting unit 301 in that the image correcting unit 302 acquires not the input signals of the L image signals and the L region information but the input signals of the R image signals and the R region information. A memory unit 307, an intensity generating unit 308, a coordinate transformation unit 309, and an interpolation unit 310 respectively may have the same configurations of the memory unit 303, the intensity generating unit 304, the coordinate transformation unit 305, and the interpolation unit 310.

Next, the extension mode and the compression mode performed by the coordinate transformation unit 305 will be described.

<1.8.1 Extension Mode>

Figure 12:
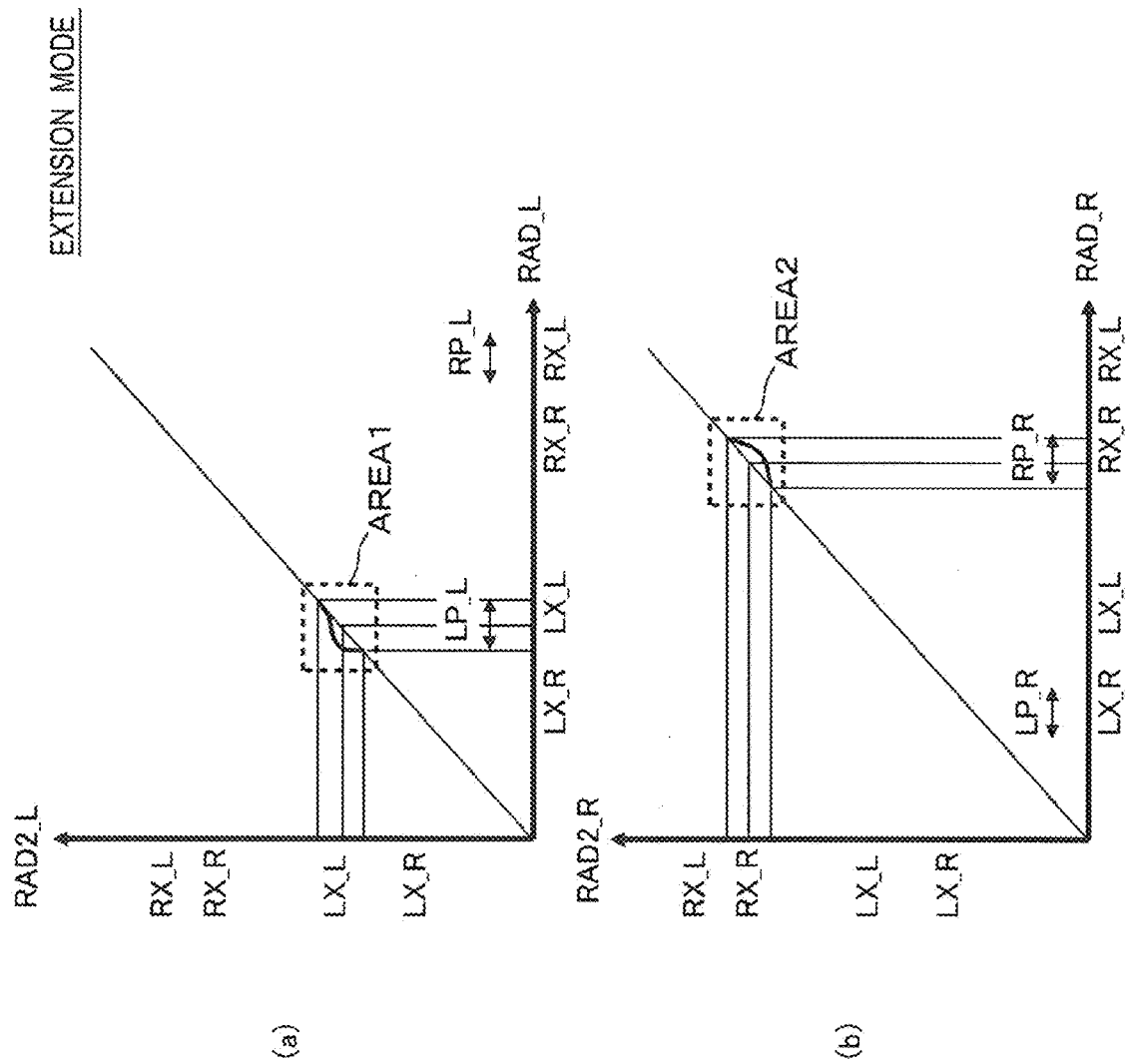
FIG. 12 shows diagrams illustrating address translation features in the case of extension mode.

First, the extension mode will be described with reference to the drawing. FIG. 12 shows diagrams illustrating address translation features in the case of the extension mode. In FIG. 12, the abscissa indicates an input address (the read-out address before the translation) and the ordinate indicates an output address (the read-out address after the translation).

FIG. 12(a) is a graph showing an address translation feature for extending a left edge portion of the L image of the main subject 1002 (see FIG. 4). FIG. 12(b) is a graph showing an address translation feature for extending a right edge portion of the R image of the main subject 1002.

In FIG. 12, LX_L and RX_L represent the positions (addresses) of the left edge and the right edge of the L image of the main subject 1002 acquired from the contour type information of the L region information, respectively. Also, LX_R and RX_R represent the positions (addresses) of the left edge and the right edge of the R image of the main subject 1002 acquired from the contour type information of the R region information, respectively.

In FIG. 12, LP_L and RP_L represent the regions in which the intensity signal for the L image K1_L (neighborhoods of LX_L and RX_L) to be input has values, respectively. Also, RP_L and RP_R represent the regions in which the intensity signal for the R image K1 R (neighborhoods of LX_R and RX_R) to be input has values, respectively.

The coordinate transformation unit 305 performs coordinate transformation on LP_L and RP_R by using the positions (addresses) of the left edge and the right edge of the L image and the R image of the main subject 1002 acquired from the contour type information of the L region information and the contour type information of the R region information.

Now, the coordinate transformation operation for the L image signals will be described.

The coordinate transformation unit 305 performs a coordinate transformation process based on the read-out address RAD_L specified by the control unit 106. As a result, the coordinate transformation unit 305 acquires the read-out address RAD2_L after the transformation.

Specifically, the coordinate transformation unit 305 performs the coordinate transformation process by (Process 1) and (Process 2) below. Here, it is assumed that data (signal values) of the L image signals have been sequentially written in the memory unit 303 according to a write address WAD_L specified by the control unit 106. Further, it is assumed that the data written in the address WAD_L of the memory unit 303 can be read out from the memory unit 303 according to the read-out address RAD_L of the same address value as that of the write address WAD_L.

(Process 1)

In the case where the read-out address RAD_L is an address corresponding to a region other than the region LP_L of FIG. 12, the coordinate transformation unit 305 acquires the read-out address RAD2_L on the assumption that RAD2_L=RAD_L according to the address translation feature shown in FIG. 12(a). That is, the coordinate transformation unit 305 acquires the same address value as that of the read-out address RAD_L as the read-out address RAD2_L.

Then, the coordinate transformation unit 305 outputs an integer part RAD2_L_Int of the acquired read-out address RAD2_L to the memory unit 303 and outputs a decimal part RAD2_L_Deci of the acquired read-out address RAD2_L to the interpolation unit 306.

(Process 2)

In the case where the read-out address RAD_L is an address corresponding to a region of the region LP_L of FIG. 12, the coordinate transformation unit 305 performs the coordinate transformation according to the address translation feature shown in FIG. 12(a). The coordinate transformation will be described with reference to FIG. 13.

Figure 13:
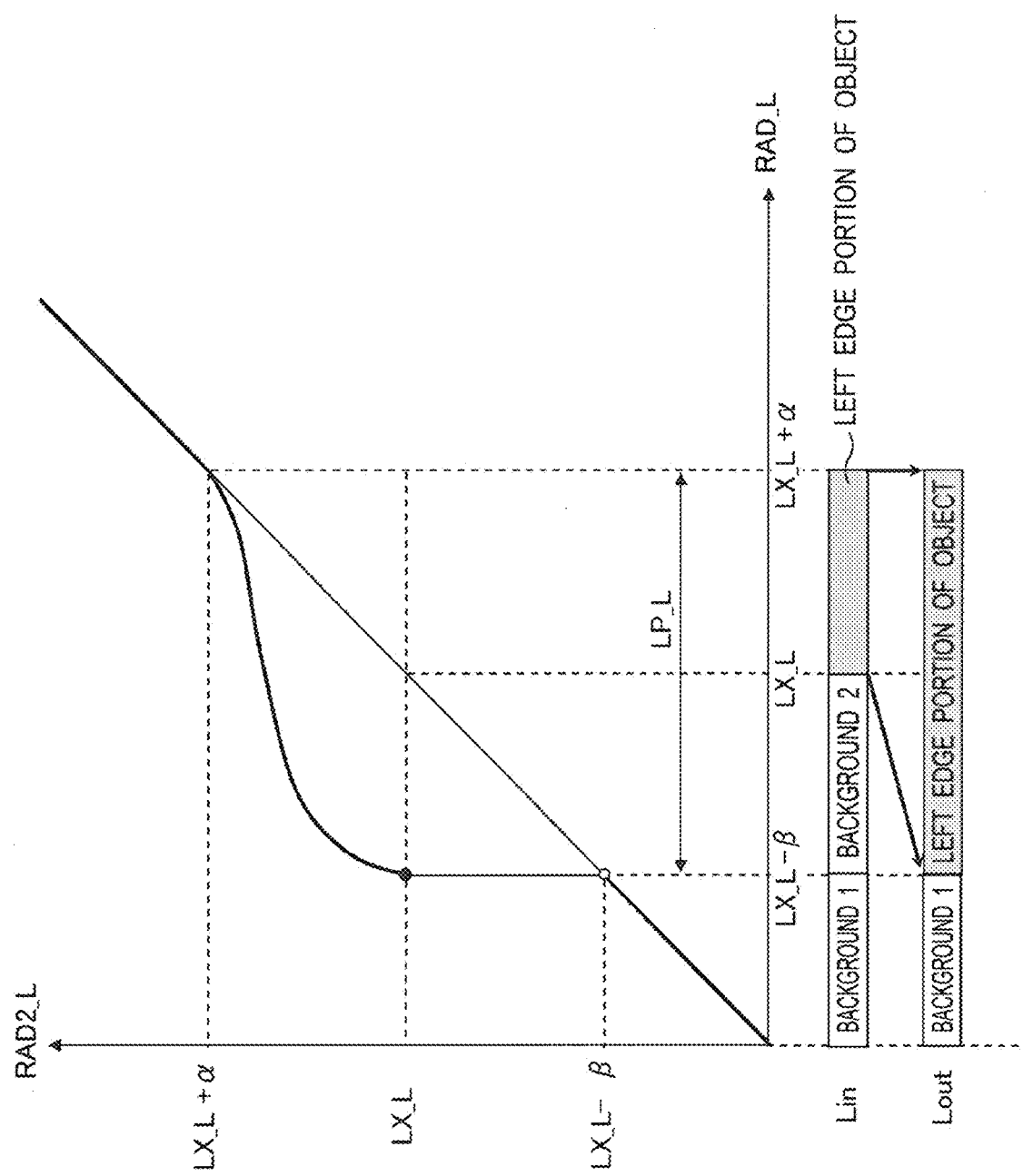
FIG. 13 is a diagram enlarging a region indicated as AREA1 in FIG. 12(a).

FIG. 13 is a diagram enlarging an AREA1 region of FIG. 12(a). In the case where the read-out address RAD_L is an address corresponding to the inside of the region LP_L as illustrated in FIG. 13, the coordinate transformation unit 305 acquires the read-out address RAD2_L after the address translation by performing the coordinate transformation to extend the left edge portion region of the main subject 1002.

That is, as illustrated in FIG. 13, in the case where RAD_L=(LX_L−β) (the address corresponding to the position "LX_L−β" is merely expressed as "LX_L−β"), the coordinate transformation is performed as RAD2_L=LX_L. As a result of the coordinate transformation unit 305 reading out data (signal values) of L image signals Lin from the memory unit 303 according to the read-out address RAD2_L(=LX_L) after the translation, data (signal values) corresponding to "LX_L" can be read out into the position corresponding to "LX_L−β" on the L image. Similarly, the coordinate transformation is performed on the address corresponding to the inside of the region LP_L (LX_L−β to LX_L+α) into an address (LX_L to LX_L+α).

That is, as described above, the coordinate transformation unit 305 performs the coordinate transformation process to read out the data of the L image Lin from the memory unit 303 according to the address value after the coordinate transformation. As a result, as illustrated in the lower part of the diagram of FIG. 13, the left edge portion of the main subject 1002 of the input L image Lin (the region of LX_L to LX_L+α) can be extended to the region of LX_L−β to LX_L+α. That is, a part indicated by a background 2 of Lin in the lower part of the diagram of FIG. 13 is replaced by the extended left edge portion region of the main subject 1002.

For example, the translation feature of a curve part (the part LX_L−β to LX_L+α) of the address translation feature illustrated in FIG. 13 is a characteristic curve (or may be a straight line) in which an output address value RAD2_L monotonically increases with respect to an input address value RAD_L.

Alternatively, the coordinate transformation unit 305 may perform the coordinate transformation process according to RAD2_L=RAD_L+μ·K1_L by multiplying the intensity signal K1_L by a suitable gain (μ). In the above described case, the magnitude of μ is set at or below a level even at the maximum of which the monotonicity is not lost.

Now, the coordinate transformation operation for the R image signals will be described.

The coordinate transformation unit 309 performs a coordinate transformation process according to the address translation feature illustrated in FIG. 12(b). Since the basic details of the process is the same as the process by the coordinate transformation unit 305, points different from the process by the coordinate transformation unit 305 will be mainly described below.

The coordinate transformation unit 309 performs the coordinate transformation process based on the read-out address RAD_R specified by the control unit 106. As a result, the coordinate transformation unit 309 acquires the read-out address RAD2_R after the transformation.

Specifically, the coordinate transformation unit 309 performs the coordinate transformation process by (Process 1) and (Process 2) below. Here, it is assumed that data (signal values) of the L image signals have been sequentially written in the memory unit 307 according to a write address WAD_R specified by the control unit 106. Further, it is assumed that the data written in the address WAD_R of the memory unit 307 can be read out from the memory unit 307 according to the read-out address RAD_R of the same address value as that of the write address WAD_R.

(Process 1)

In the case where the read-out address RAD_R is an address corresponding to a region other than the region RP_R of FIG. 12, the coordinate transformation unit 309 transforms to RAD2_R=RAD_R according to the address translation feature shown in FIG. 12(b). That is, the coordinate transformation unit 309 acquires the same address as that of the read-out address RAD_R as the read-out address RAD2_R. Then, the coordinate transformation unit 309 outputs an integer part RAD2_R_Int of the acquired read-out address RAD2_R to the memory unit 307 and outputs a decimal part RAD2_R_Deci of the acquired read-out address RAD2_R to the interpolation unit 310.

(Process 2)

In the case where the read-out address RAD_R is an address corresponding to a region of the region RP_R of FIG. 12, the coordinate transformation unit 309 performs the coordinate transformation process according to the address translation feature shown in FIG. 12(b).

Figure 14:
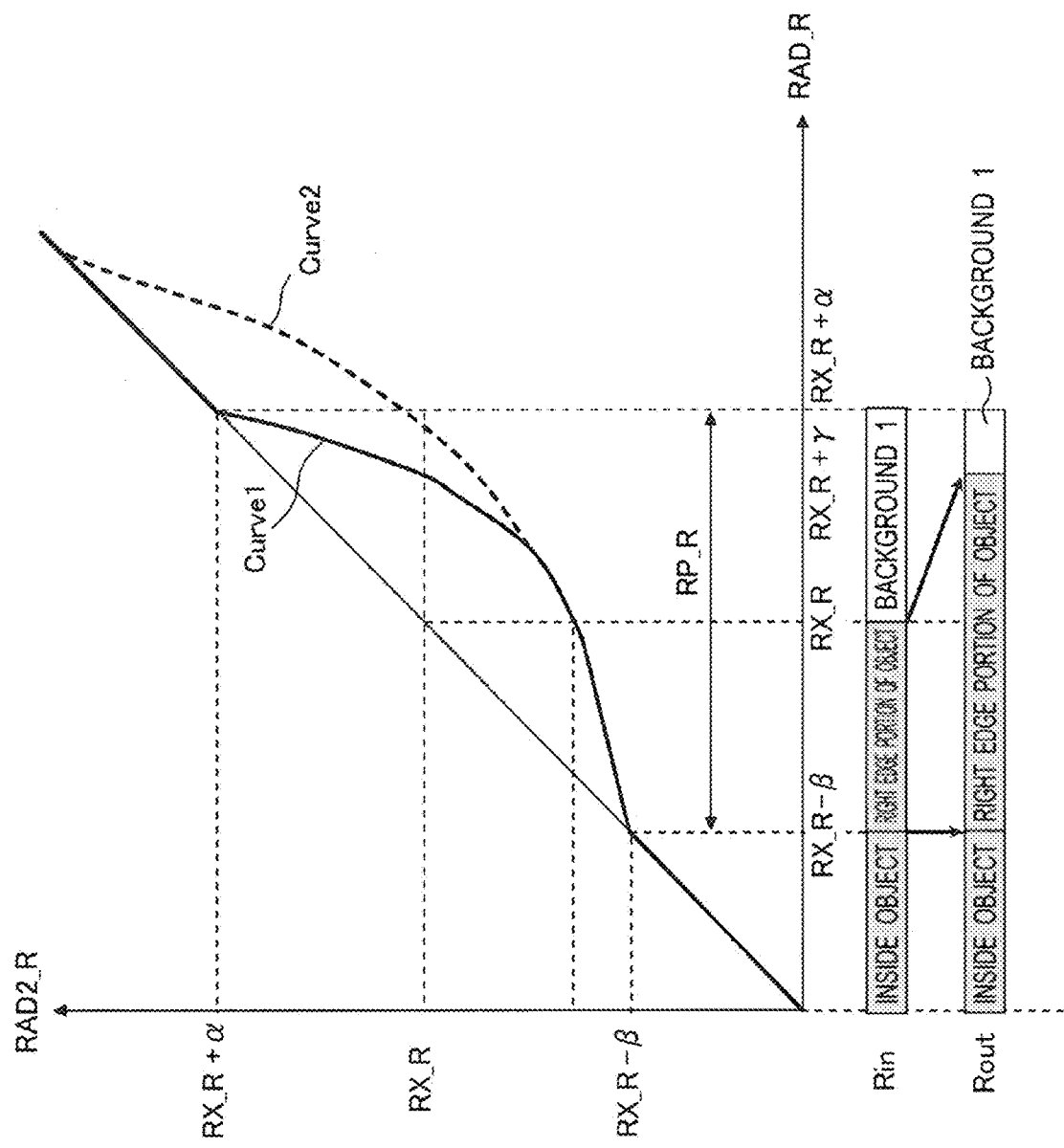
FIG. 14 is a diagram enlarging a region indicated by AREA2 in FIG. 12(b).

FIG. 14 is a diagram enlarging an AREA2 region of FIG. 12(b). In the case where the read-out address RAD_R is an address corresponding to the inside of the region RP_R as illustrated in FIG. 14, the coordinate transformation unit 309 acquires the read-out address RAD2_R after the coordinate transformation by performing the coordinate transformation to extend the right edge portion region of the main subject 1002.

That is, (A) in the case where RAD_R is contained in a region RX_R−β to RX_R in an address translation feature curve Curve1 shown in FIG. 14, the gradient of the address translation feature curve is small, and (B) in the case where RAD_R is contained in a region RX_R to RX_R−α, the gradient of the address translation feature curve is large.

As a result of the coordinate transformation unit 309 performing an address translation process by using the address translation feature curve Curve1 shown in FIG. 14, the right edge portion region of the main subject 1002 can be extended.

As a result of the coordinate transformation unit 309 performing the coordinate transformation process and reading out data (signal values) of an R image Rin from the memory unit 307 according to the address after the coordinate transformation in the above described manner, the right edge portion of the main subject 1002 of the input R image Rin (the region RX_R−β to RX_R) can be extended to a region RX_R−β to RX_R+α as shown in the lower part of the diagram of FIG. 14. A part indicated by a background 1 of Rin in the lower part of the diagram of FIG. 14 (a part RX_R to RX_R+α) is compressed (shrunk) to a region (RX_R+γ to RX_R+α).

For example, the translation feature of a curve part (the part RX_R−β to RX_R+α) of the address translation feature illustrated in FIG. 14 is a characteristic curve (or may be a straight line) in which an output address value RAD2_R monotonically increases with respect to an input address value RAD_R.

Alternatively, the coordinate transformation unit 309 may perform the coordinate transformation process according to RAD2_R=RAD_R−μ·K1_R by multiplying the intensity signal K1_R by a suitable gain (μ). In the above described case, the magnitude of p is set at or below a level even at the maximum of which the monotonicity is not lost.

In the coordinate transformation process, the coordinate transformation unit 309 may be adapted to perform the coordinate transformation process by using an address translation feature curve Curve2 shown by a dotted line in FIG. 14 instead of the address translation feature curve Curve1. That is, as compared with the address translation feature curve Curve1, the address translation feature curve Curve2 in the region (RX_R+γ to RX_R+α) curves with a small gradient and gradually increases to meet the straight line RAD2_R=RAD_R.

Therefore, as a result of the coordinate transformation unit 309 performing the address translation process according to the address translation feature curve Curve2, abrupt compression of the background 1 shown in the lower part of the diagram of FIG. 14 can be suppressed. As a result, the R image with the part indicated by the background 1 which has been smoothly compressed can be acquired.

The input addresses RAD_L and RAD_R are integer values, whereas the output addresses RAD2_L and RAD2_R have fractional values. Here, it is assumed that the output addresses RAD2_L and RAD2_R have 4 bits after the decimal point.

Figure 15:
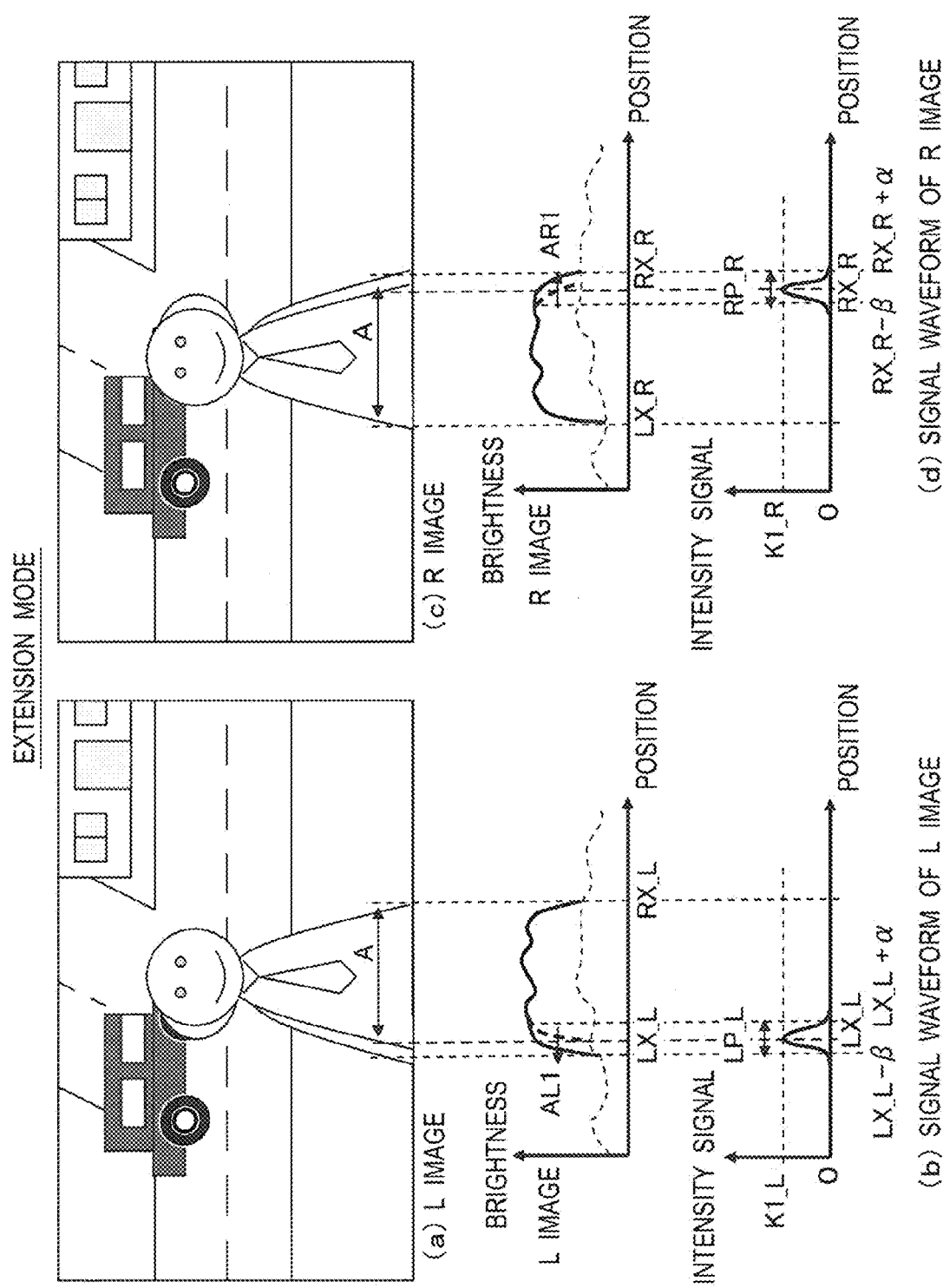
FIG. 15 shows diagrams schematically illustrating a result of stereoscopic capturing process of an internal region A of a main subject by the stereoscopic imaging apparatus.
Figure 16:
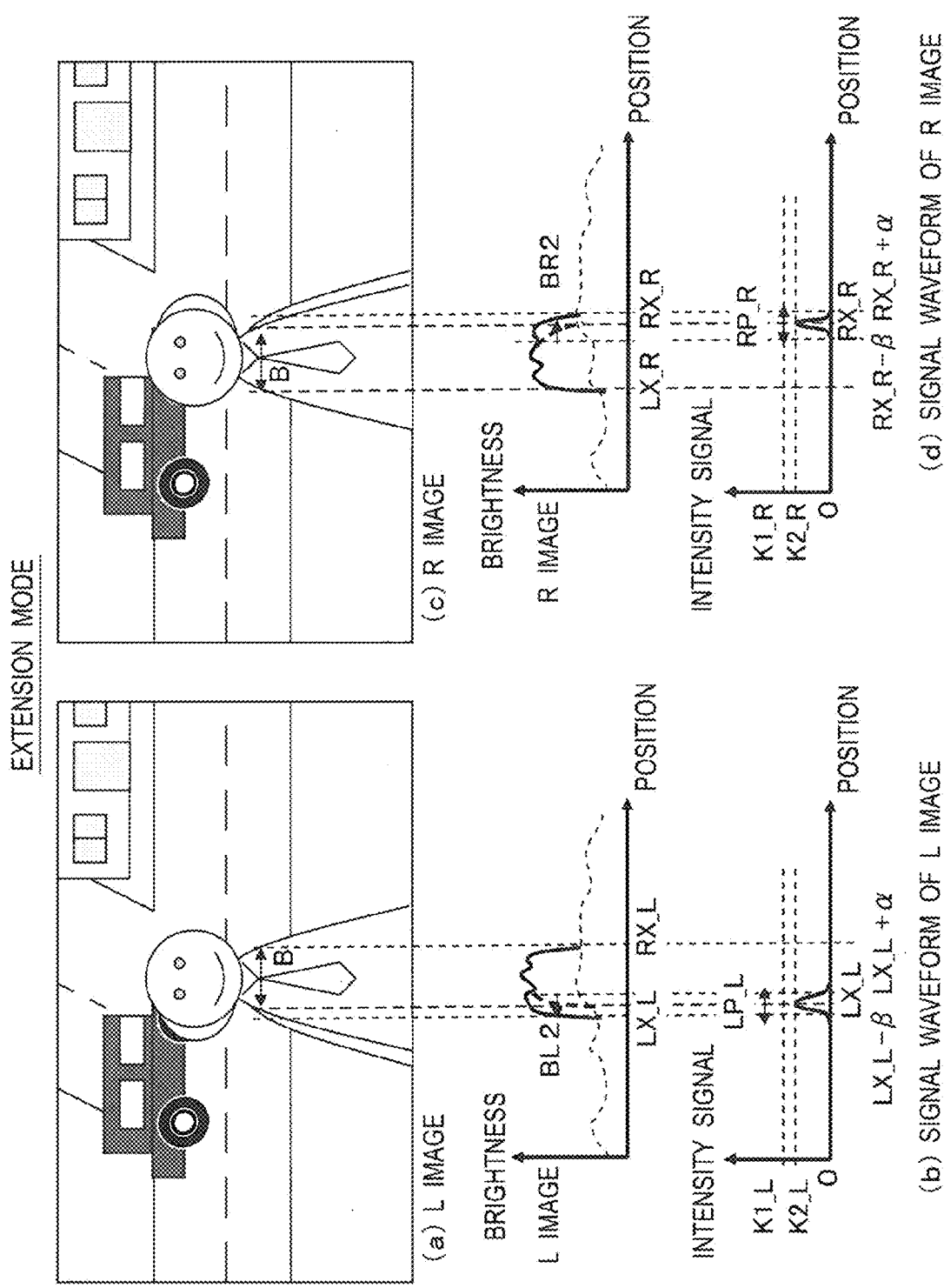
FIG. 16 shows diagrams schematically illustrating a result of stereoscopic capturing process of an internal region B of the main subject by the stereoscopic imaging apparatus.

Results of the above described processes performed by the coordinate transformation unit 309 (a processing result in the extension mode) are shown in FIG. 15 and FIG. 16.

FIG. 15 shows diagrams schematically illustrating a result of stereoscopic capturing process of an internal region A of the main subject 1002 by the stereoscopic imaging apparatus 100. FIG. 16 shows diagrams schematically illustrating a result of stereoscopic capturing process of an internal region B of the main subject 1002 by the stereoscopic imaging apparatus 100. It is assumed that the internal region B of the main subject 1002 is narrower than the internal region A.

As illustrated in FIG. 15, an area of the left side contour (the left edge portion region) of the main subject 1002 of the L image is smoothly extended to left as shown by an arrow AL1. Similarly, an area of the right side contour (the right edge portion region) of the main subject 1002 of the R image is also smoothly extended to right as shown by an arrow AR1.

As a result, in the stereoscopic view images, the parallax of the internal region A of the main subject 1002 is S, which does not differ from that of the input original picture. Therefore, the distances from the imaging units to a fixed place of the main subject 1002 in the stereoscopic view images are perceived as the same.

In the L image of FIG. 15(a), the left side contour (the left edge portion region) of the main subject 1002 is extended to left based on the intensity signal K1_L of FIG. 15(b). As a result, the parallax at the left side contour (the left edge portion region) becomes SL1. Also, in the R image of FIG. 15(c), the right side contour (the right edge portion region) of the main subject the main subject 1002 is extended to right based on the intensity signal K1_R of FIG. 15(b). As a result, the parallax at the right side contour (the right edge portion region) becomes SR1.

Since SL1<S and SR1<S in that case, the parallax of the stereoscopic view images acquired by the stereoscopic imaging apparatus 100 changes in the direction to bring the main subject 1002 farther when the images are perceived as a stereoscopic image. That is, as compared with the internal region of the main subject 1002, areas around the contour of the main subject 1002 (the left edge portion region and the right edge portion region) are brought slightly farther. As a result, in the stereoscopic view images acquired by the stereoscopic imaging apparatus 100, roundness of the areas around the contour of the main subject 1002 which curves backward is accurately expressed.

On the condition that the roundness of the areas around the contour of the main subject 1002 is perceived, the viewer's brain recognizes the main subject 1002 as a three-dimensional object instead of a flat object. As a result, the cardboard effect of the image is reduced.

As is apparent from FIG. 16, the area of the left side contour (the left edge portion region) of the main subject 1002 of the L image is smoothly extended to left as shown by an arrow BL2. Similarly, an area of the right side contour (the right edge portion region) of the main subject 1002 of the R image is also smoothly extended to right as shown by an arrow BR2.

As a result, in the stereoscopic view images, the parallax of the internal region B of the main subject 1002 is S, which does not differ from that of the input original picture. Therefore, the distances from the imaging units to a fixed place of the object in the stereoscopic view images are perceived as the same.

In the L image of FIG. 16(a), the left side contour (the left edge portion region) of the main subject 1002 is extended to left based on the intensity signal K2_L of FIG. 16(b). The intensity signal K2_L is generated by the intensity generating unit 304 by using the parallax signal generated based on characteristics shown in FIG. 10. As a result, in the case where the width of the internal region A is wider than the width of the internal region B, K1_L is larger than K2_L. As a result, the parallax at the left side contour (the left edge portion region) becomes SL2.

Also, in the R image of FIG. 16(c), the right side contour (the right edge portion region) of the main subject 1002 is extended to left based on the intensity signal K2_R of FIG. 16(c). The intensity signal K2_R is generated by the intensity generating unit 308 by using the parallax signal generated based on the characteristics shown in FIG. 10. As a result, in the case where the width of the internal region A is wider than the width of the internal region B, K1_R>K2_R. As a result, the parallax at the right side contour (the right edge portion region) becomes SL2.

In that case, relationships SL1<SL2<S and SR1<SR2<S are satisfied. As a result, the parallax of the stereoscopic view images changes in the direction to bring the perceived stereoscopic image farther. However, the stereoscopic image of the areas around the contour of the internal region B (the left edge portion region and the right edge portion region) comes out to be not as far as the stereoscopic image of the areas around the contour of the internal region A (the left edge portion region and the right edge portion region).

A general object with a wide width has a depth (thickness) according to the width. That is, the wider the object, the more depth it tends to have. Therefore, as a result of bringing the stereoscopic image of the area around the contour farther according to the width in order to give roundness of backward curve to the appearance of the stereoscopic image, natural stereoscopic effect is provided to the image. Especially in the case where the object is in a columnar shape such as a person, quite natural stereoscopic effect can be provided to the image.

<1.8.2 Compression Mode>

Now, compression mode will be described with reference to the drawings. However, description of the same parts as those in the extension mode will be omitted.

Figure 17:
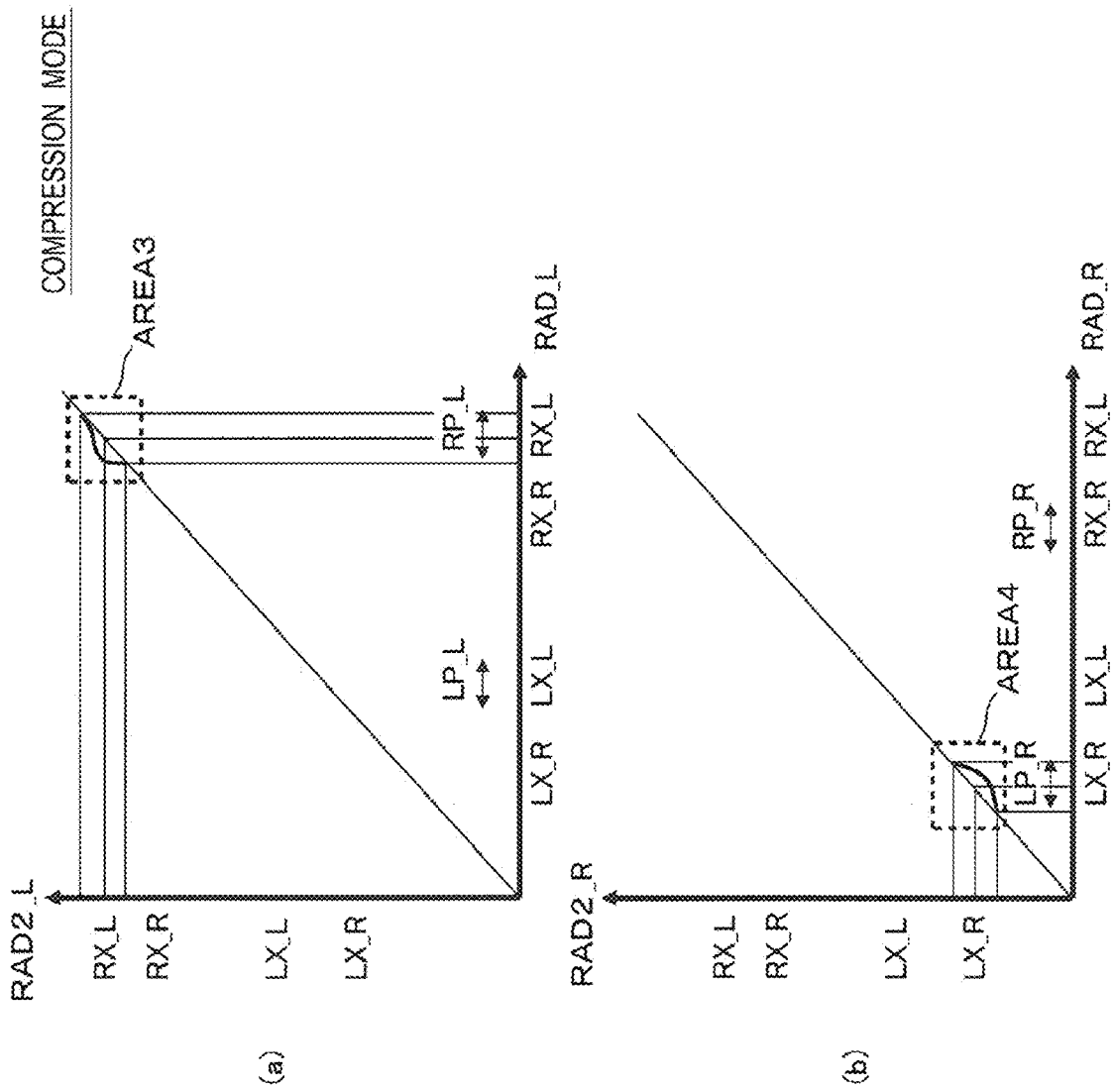
FIG. 17 shows diagrams illustrating address translation features in the case of compression mode.

FIG. 17 shows diagrams illustrating address translation features in the case of the compression mode. In FIG. 17, the abscissa indicates an input address (the read-out address before the translation) and the ordinate indicates an output address (the read-out address after the translation).

Specifically, FIG. 17(a) is a graph showing an address translation feature for narrowing the right edge portion of the L image of the main subject 1002 (see FIG. 4). FIG. 17(b) is a graph showing an address translation feature for narrowing the left edge portion of the R image of the main subject 1002. FIG. 17(a) shows a translation feature for the L image signals, whereas FIG. 17(b) shows a translation feature for the L image signals.

In FIG. 17, LX_L and RX_L represent the positions (addresses) of the left edge and the right edge of the L image of the main subject 1002 acquired from the contour type information of the L region information. Also, LX_R and RX_R represent the positions (addresses) of the left edge and the right edge of the R image of the main subject 1002 acquired from the contour type information of the R region information.

Further, in FIG. 17, LP_L and RP_L represent the regions in which the intensity signal for the input L image K1_L has values, respectively (neighborhoods of LX_L and RX_L). Also, RP_L and RP_R represent the regions in which the intensity signal for the input R image K1_R has values, respectively (neighborhoods of LX_R and RX_R).

The coordinate transformation unit 305 performs the coordinate transformation on RP_L and LP_R by using the positions (addresses) of the left edge and the right edge of the L image and the R image of the main subject 1002 acquired from the contour type information of the L region information and the contour type information of the R region information.

Processes in the coordinate transformation unit 305, the memory unit 303, and the interpolation unit 306 may be the same as the processes in the coordinate transformation unit 305, the memory unit 303, and the interpolation unit 306 described in the processes in the extension mode.

The address translation features in the extension mode differ from the address translation features in the compression mode in that the former are exemplified in FIG. 12 whereas the latter are exemplified in FIG. 17.

In the compression mode, processes in the coordinate transformation unit 305, the memory unit 303, and the interpolation unit 306 are performed in accordance with the address translation features shown in FIG. 17. As a result, the right edge portion region of the main subject 1002 is compressed in the L image and the left edge portion region of the main subject 1002 is compressed in the R image.

Figure 18:
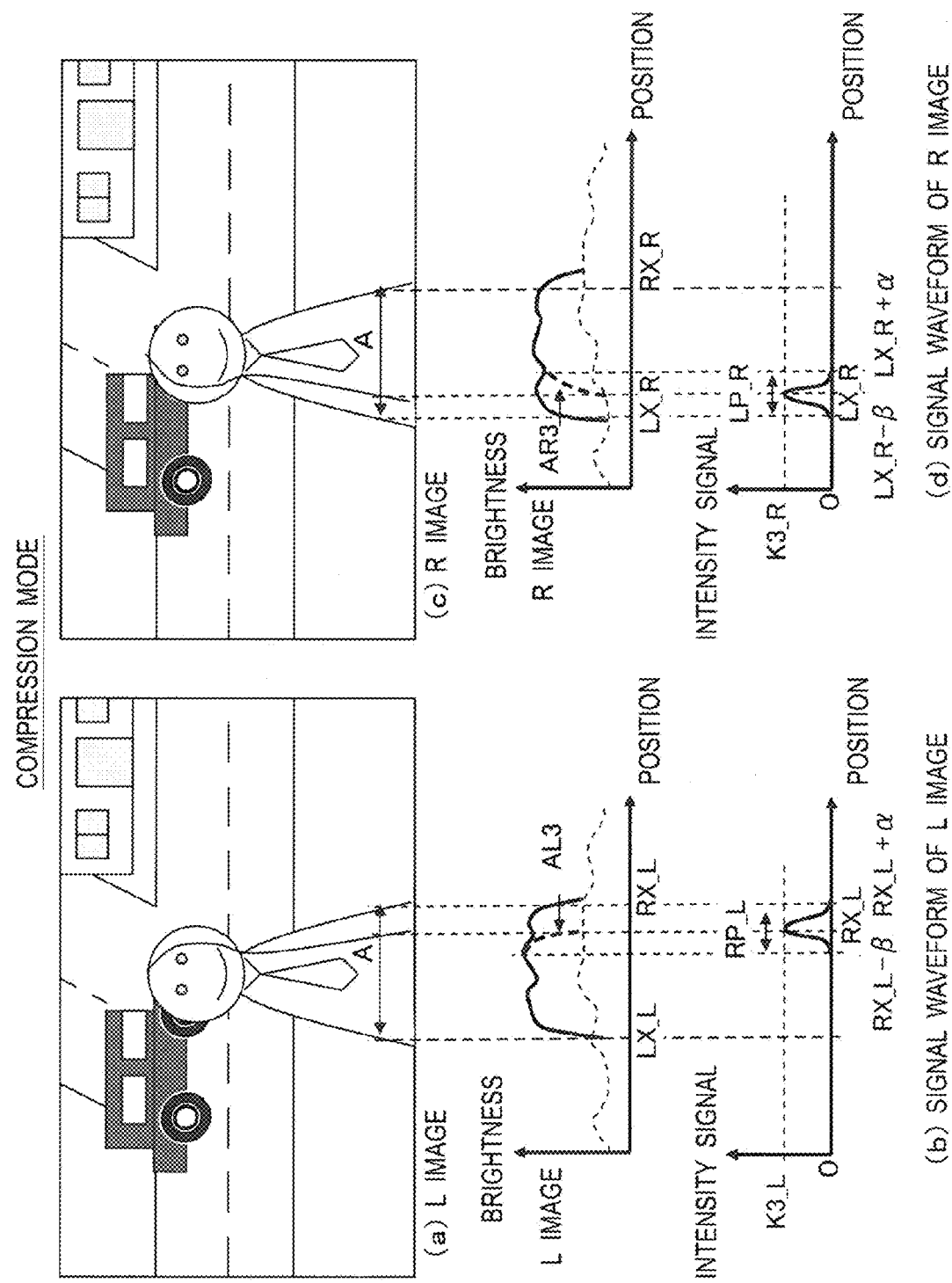
FIG. 18 shows diagrams schematically illustrating a result of stereoscopic capturing process of the internal region A of the main subject by the stereoscopic imaging apparatus.
Figure 19:
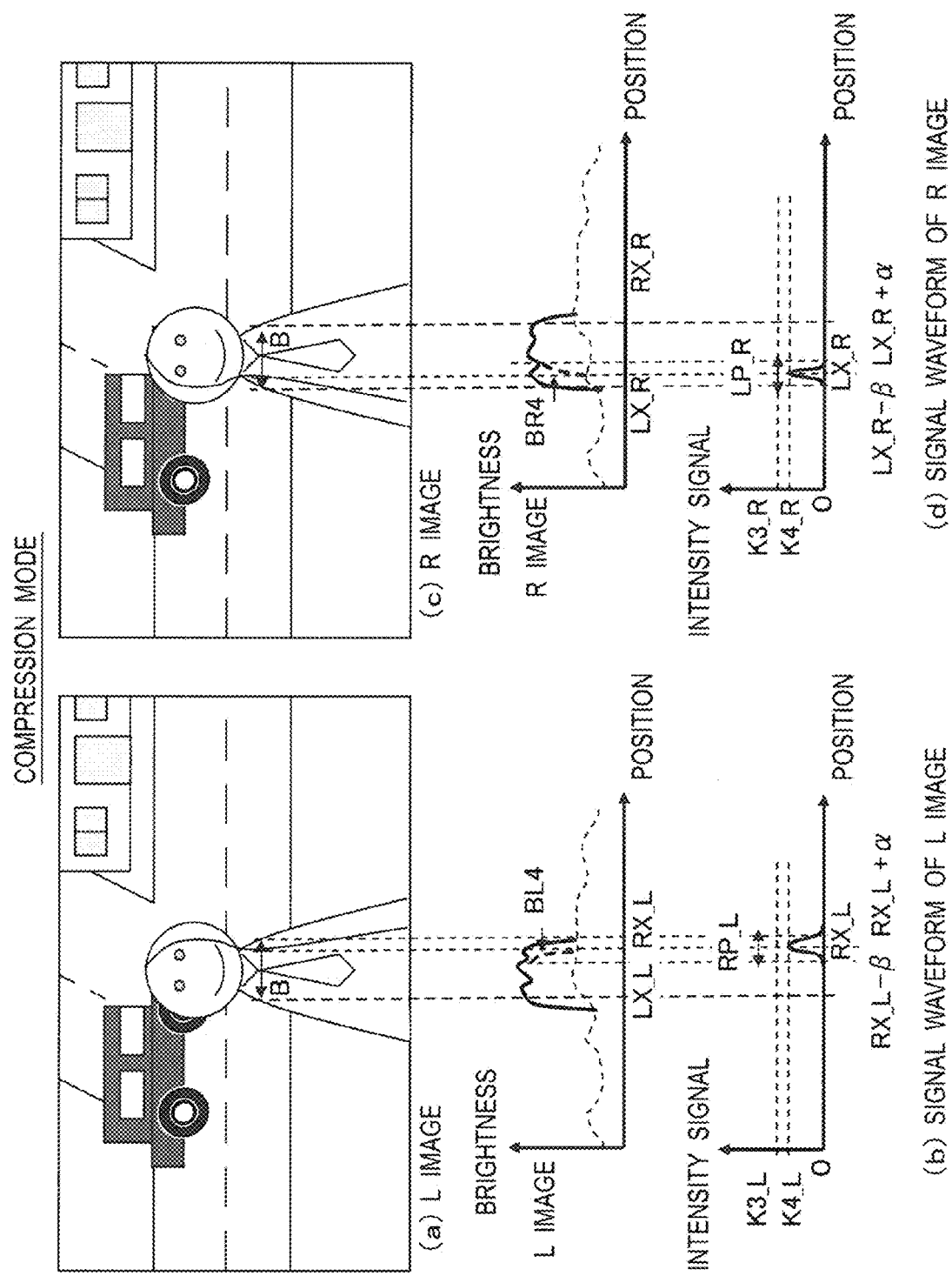
FIG. 19 shows diagrams schematically illustrating a result of stereoscopic capturing process of the internal region B of the subject by the stereoscopic imaging apparatus.

Processing results in the compression mode of the stereoscopic imaging apparatus 100 are shown in FIG. 18 and FIG. 19.

FIG. 18 shows diagrams schematically illustrating a result of stereoscopic capturing process of the internal region A of the main subject 1002 by the stereoscopic imaging apparatus 100. FIG. 19 shows diagrams schematically illustrating a result of stereoscopic capturing process of the internal region B of the main subject 1002 by the stereoscopic imaging apparatus 100. It is assumed that the internal region B of the main subject 1002 is narrower than the internal region A.

In FIG. 18, an area of the right side contour (the right edge portion region) of the main subject 1002 of the L image is smoothly compressed to left as shown by an arrow AL3. Similarly, an area of the left side contour (the left edge portion region) of the main subject 1002 of the R image is also smoothly compressed to right as shown by an arrow AR3.

As a result, in the stereoscopic view images, the parallax of the internal region A of the main subject 1002 is S, which does not differ from that of the input original picture. Therefore, the distances from the imaging units to a fixed place of the object in the stereoscopic view images are perceived as the same.

In the L image of FIG. 16(a), the left side contour (the left edge portion region) of the main subject 1002 is extended to left based on the intensity signal K2_L of FIG. 16(b). The intensity signal K2_L is generated by the intensity generating unit 304 by using the parallax signal generated based on the characteristics shown in FIG. 10. As a result, in the case where the width of the internal region A is wider than the width of the internal region B, K1_L is larger than K2_L. As a result, the parallax at the left side contour (the left edge portion region) becomes SL2.

Also, in the R image of FIG. 16(c), the right side contour (the right edge portion region) of the main subject 1002 is extended to left based on the intensity signal K2_R of FIG. 16(c). The intensity signal K2_R is generated by the intensity generating unit 308 by using the parallax signal generated based on the characteristics shown in FIG. 10. As a result, in the case where the width of the internal region A is wider than the width of the internal region B, K1_R>K2_R. As a result, the parallax at the right side contour (the right edge portion region) becomes SL2.

In the L image of FIG. 18(a), the right side contour (the right edge portion region) of the main subject 1002 is compressed to left based on the intensity signal K3_L of FIG. 18(b). As a result, the parallax at the right side contour (the right edge portion region) becomes SL3. In the R image of FIG. 18(c), the left side contour (the left edge portion region) of the main subject 1002 is compressed to right based on the intensity signal K3_R of FIG. 18(b). As a result, the parallax at the left side contour (the left edge portion region) becomes SR3.

In the above described case, since SL3<S and SR3<S, the parallax of the stereoscopic view images changes in the direction to bring the perceived stereoscopic image farther. As a result, as compared with the inside of the main subject 1002, areas around the contour of the main subject 1002 (the left edge portion region and the right edge portion region) are brought slightly farther. Then, in the stereoscopic view images acquired by the stereoscopic imaging apparatus 100, roundness of the areas around the contour of the main subject 1002 which curves backward is accurately expressed.

On the condition that the roundness of the areas around the contour of the main subject 1002 is perceived, the viewer's brain recognizes the main subject 1002 as a three-dimensional object instead of a flat object. As a result, the cardboard effect of the image is reduced.

As illustrated in FIG. 19, an area of the right side contour (the right edge portion region) of the main subject 1002 of the L image is smoothly compressed to left as shown by an arrow BL4. Similarly, an area of the left side contour (the left edge portion region) of the main subject 1002 of the R image is also smoothly compressed to right as shown by an arrow BR4.

As a result, in the stereoscopic view images, the parallax of the internal region B of the main subject 1002 is S, which does not differ from the input original picture. Therefore, the distances from the imaging units to a fixed place of the object in the stereoscopic view images are perceived as the same.

In the L image of FIG. 19(a), the right side contour (the right edge portion region) of the main subject 1002 is compressed to left based on the intensity signal K4_L of FIG. 19(b). The intensity signal K4_L is generated by the intensity generating unit 304 by using the parallax signal generated based on the characteristics shown in FIG. 10. As a result, in the case where the width of the internal region A is wider than the width of the internal region B, K3_L is larger than K4_L. Then, the parallax at the right side contour (the right edge portion region) becomes SL4.

Also, in the R image of FIG. 19(c), the left side contour (the left edge portion region) of the main subject 1002 is compressed to left based on the intensity signal K4_R of FIG. 19(c). The intensity signal K4_R is generated by the intensity generating unit 304 by using the parallax signal generated based on the characteristics shown in FIG. 10. As a result, in the case where the width of the internal region A is wider than the width of the internal region B, K3_R>K4_R. Then, the parallax at the left side contour (the left edge portion region) becomes SL4.

In that case, relationships SL3<SL4<S and SR3 <SR4<S are satisfied. As a result, the parallax of the stereoscopic view images changes in the direction to bring the perceived stereoscopic image farther. However, the stereoscopic image of the areas around the contour of the internal region B (the left edge portion region and the right edge portion region) comes out to be not as far as the stereoscopic image of the areas around the contour of the internal region A (the left edge portion region and the right edge portion region).

A general object with a wide width has a depth (thickness) according to the width. That is, the wider the object, the more depth it tends to have. Therefore, as a result of bringing the stereoscopic image of the area around the contour farther according to the width in order to give roundness of backward curve to the appearance of the stereoscopic image, natural stereoscopic effect is provided to the image. Especially in the case where the object is in a columnar shape such as a person, quite natural stereoscopic effect can be provided to the image.

Although the processes in the extension mode and the processes in the compression mode are described as separate processes in the present embodiment, a method of concurrently using these processes is also possible. Since that method brings little deformation into the image and does not cause the width of the object to be changed in the stereoscopic image, it can provide a stereoscopic image having a good image quality.

<2. Second Embodiment>

In the above described embodiment, the region information calculating unit 203 may change the calculating operation of the width information according to the acquired L depth information or R depth information.

For example, in calculating the width information, the region information calculating unit 203 operates not to count a pixel for which the region information calculating unit 203 has acquired the L depth information or R depth information exceeding a predetermined threshold. That is, the region information calculating unit 203 assumes that it needs not to resume the depth (thickness) of a subject farther than a predetermined fixed position, thus, calculates the width information of the subject so as not to perform the correction process for giving the above described roundness to the subject.

The region information calculating unit 203 performs that kind of process because a distant view generally has a poor stereoscopic effect and therefore the above described correction process for giving the roundness of backward curve to an edge of such a distant view as a mountain or a cloud may produce an unnatural stereoscopic image.

<3. Third Embodiment>

In the above described embodiments, the correction process is performed for increasing the parallax for the wider image.

Figure 20:
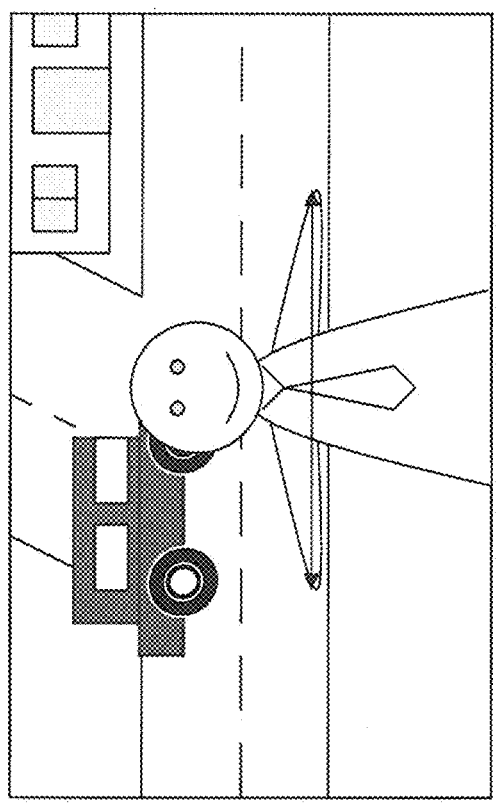
FIG. 20 is a diagram illustrating an example of an object which is short in vertical direction and long in horizontal direction.

However, on the condition that the correction process is performed on stereoscopic view images of a subject which is short in the vertical direction like a subject stretching out his arms sideways illustrated in FIG. 20, the positions of the hands are fixed extremely deep in the background so that the image may be perceived as unnatural. Generally, most objects which are short in the vertical direction and long in the horizontal direction in images may have a little thickness in fact.

By taking account of that tendency, in the present embodiment, the correction process for increasing the parallax is not performed on a part of the extracted subject region which has a length in the vertical direction as long as or less than a predetermined value, i.e., a part which is short in the vertical direction. Specifically, the region information calculating unit 203 applies a vertical median filter to objective images before performing the calculating operation of the width information. As a result, a region which is shorter than a filter size in the vertical direction is deleted from the foreground information. FIG. 21 shows diagrams illustrating the progress, with FIG. 21(a) indicating an example of foreground information (image) before having a median filter applied and FIG. 21(b) indicating an example of foreground information (image) after having the median filter applied. The region information calculating unit 203 calculates the width information by using the foreground information after having the filter applied.

As a result, the correction process for increasing the parallax is not performed on a vertically short part and only performed on the other regions.

Although the median filter is used to delete a vertically short part from the subject regions in the above description, the median filter is merely an example and other filters such as a low-pass filter may be used. That is, any method may be adopted as far as the method can delete a vertically short part.

<4. Fourth Embodiment>

In the above described embodiments, a configuration of calculating the L depth information and the R depth information based on the L image signals and the R image signals is shown. However, a configuration of the stereoscopic imaging apparatus 100 is not limited to the above described configuration and may include a distance acquiring unit (measuring unit) for acquiring a distance signal (for example, a depth map signal) by measuring a distance from a third viewpoint position different from the first viewpoint position and the second viewpoint position to the subject.

Figure 22:
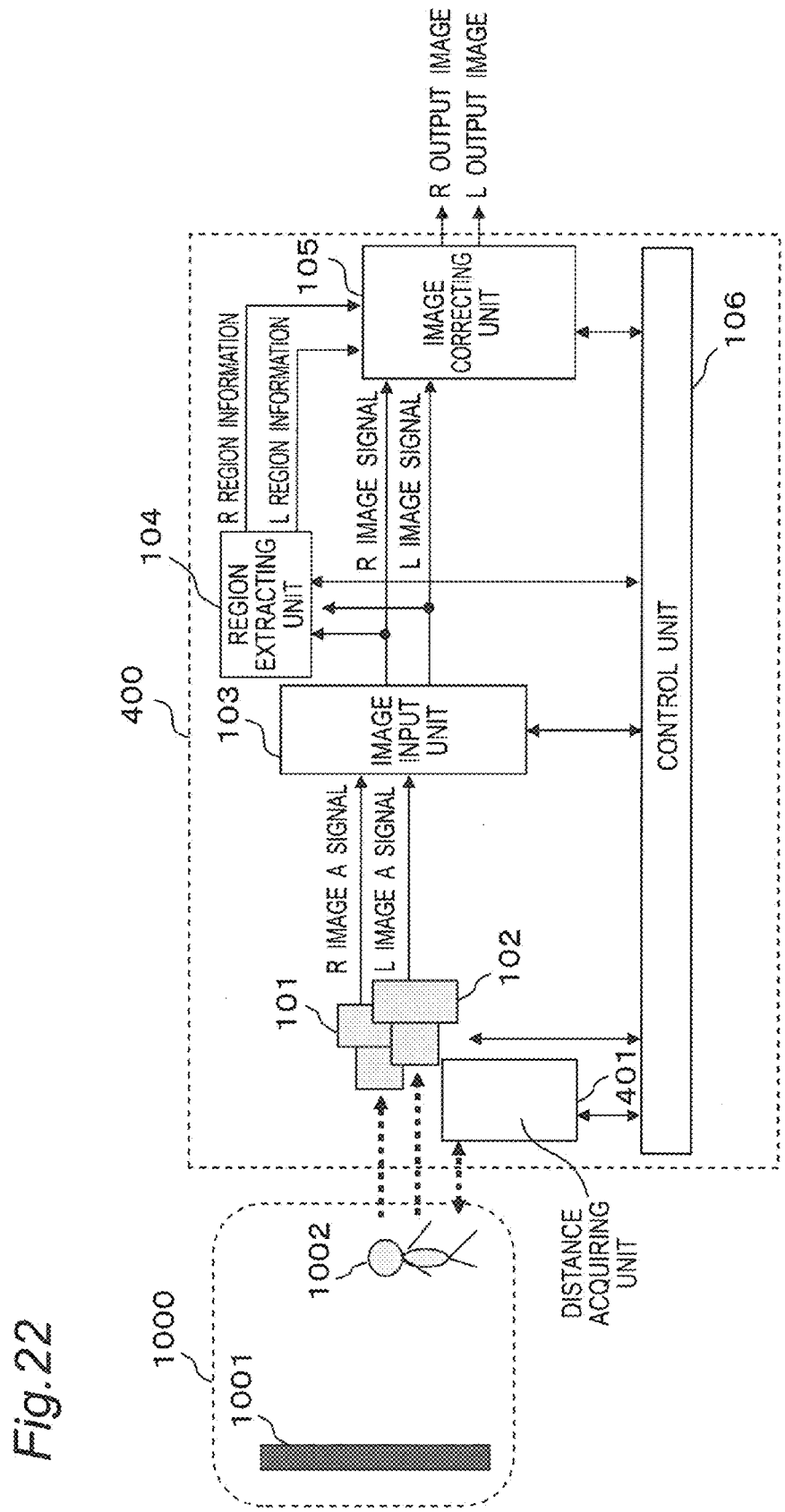
FIG. 22 is a block diagram illustrating an outline of another stereoscopic imaging apparatus.

FIG. 22 is a block diagram illustrating an outline of a stereoscopic imaging apparatus 400 according to the fourth embodiment. The same members as those of the stereoscopic imaging apparatus 100 illustrated in FIG. 1 in the configuration of the stereoscopic imaging apparatus 400 illustrated in FIG. 22 are denoted by the same or similar reference symbols and the description of them will be omitted. The stereoscopic imaging apparatus 400 has a distance acquiring unit 401 at a site different from the first imaging unit 101 and the second imaging unit 102.

The distance acquiring unit 401 has an infrared light irradiating unit for irradiating an infrared light (IR), an optical system for collecting an infrared light reflected from the subject among the irradiated infrared light, and an imaging device for converting the collected infrared light into electric signals by photoelectric conversion. The distance acquiring unit 401 acquires the distance signal in a TOF method (Time Of Flight method) which is for measuring a distance signal to the subject based on a time interval from the irradiation of the infrared light to the return of the reflected infrared light and intensity of the infrared light.

Then, the distance acquiring unit 401 outputs the acquired distance signal to the depth generating unit 201. The depth generating unit 201 calculates the L depth information and the R depth information by using the distance signal acquired from the distance acquiring unit 401.

In the above example, the distance acquiring unit 401 using the TOF method for the infrared light has been described. However, the configuration of the distance acquiring unit is not limited to that of the TOF method for the infrared light and any method may be adopted as far as it is a distance sensor configured to acquire a distance to the subject. For example, the distance acquiring unit may be of a TOF method for a laser beam for acquiring a distance signal based on a time period from the irradiation of the laser beam to the return of the reflected laser beam. Alternatively, the distance acquiring unit may be of a method which has an imaging unit different from the first imaging unit 101 and the second imaging unit 102 provided and acquires a distance signal to the subject based on an image acquired by that different imaging unit.

<5. Effects, Etc.>

As described above, in the aforementioned embodiments, the stereoscopic imaging apparatus 100 (an example of stereoscopic image processing apparatuses) includes: the first imaging unit 101, the second imaging unit 102, and the image input unit 103 (examples of an acquiring unit) operable to acquire a stereoscopic view image which includes the L image and the R image, the stereoscopic view image representing a stereoscopic image by means of parallax between the L image and the R image; the region extracting unit 104 (an example of an extracting unit) operable to extract a subject region from the acquired stereoscopic view image, the subject region giving a stereoscopic image of a specific subject; the region information calculating unit 203 (an example of a calculating unit) operable to calculate a length of the extracted subject region in a parallax direction; and the image correcting unit 105 operable to adjust parallax at an edge of the subject region based on the calculated length of the subject region in the parallax direction.

Further, the stereoscopic image processing method according to the aforementioned embodiments includes: extracting a subject region which represents a stereoscopic image of a specific subject from a stereoscopic view image which includes a left eye image and a right eye image, the stereoscopic view image representing the stereoscopic image by means of parallax between the left eye image and the right eye image; and adjusting parallax at an edge of the subject region based on a length of the extracted subject regions in a parallax direction.

As a result, a natural stereoscopic effect is added to the stereoscopic view images so that the stereoscopic view images which hardly suffer a cardboard phenomenon can be acquired.

Further, in the aforementioned embodiments, the image correcting unit 105 may adjust the parallax at the edge of the subject region to bring a localization position of a stereoscopic image at the edge of the subject region farther as the calculated length of the subject region in the parallax direction are longer.

Further, in the adjusting of the stereoscopic image processing method according to the embodiments, the parallax at the edge of the subject region may be adjusted to bring a localization position of the stereoscopic image at the edge of the subject region farther as the calculated length of the subject region in the parallax direction is longer.

A general object with a wide width (in a general parallax direction) has a depth (thickness) according to the width. That is, the wider the object, the more depth it tends to have. Therefore, as a result of bringing the stereoscopic image of the area around the contour farther according to the width in order to give roundness of backward curve to the appearance of the stereoscopic image, natural stereoscopic effect is provided to the image.

Further, in the aforementioned embodiments, the region information calculating unit 203 (an example of the calculating unit) may calculate the length of the subject region in the parallax direction for each pixel line, and the image correcting unit 105 may adjust the parallax at the edge of the subject region based on the length of the subject region in the parallax direction calculated for each pixel line.

A general object with a wide width (in a general parallax direction) has a depth (thickness) according to the width. That is, the wider the object, the more depth it tends to have. Therefore, as a result of bringing the stereoscopic image of the area around the contour farther according to the width in order to give roundness of backward curve to the appearance of the stereoscopic image, natural stereoscopic effect is provided to the image.

Further, in the aforementioned embodiments, the region extracting unit 104 may have the depth generating unit 201 (an example of a generating unit) operable to generate distance information about a distance from a capturing position to the subject for each pixel of the acquired stereoscopic view image based on the parallax between the L image and the R image, and the region extracting unit 104 may extract the subject region from the stereoscopic view image based on the generated distance information.

As a result, the information about distances from a capturing position to the subject can be generated from the information contained in the stereoscopic view images, and based on the distance information, the subject regions can be extracted.

Further, in the aforementioned embodiments, the region extracting unit 104 has the binarization unit 202 operable to perform a binarization process on the acquired stereoscopic view image based on the generated distance information.

Then, the binarization process according to the information about distances from a capturing position to the subject is performed on the stereoscopic view images, and as a result of the binarization process, the subject and another subject contained in the stereoscopic view images at different positions or the subject and the background can be accurately separated.

Further, in the aforementioned embodiments, the image correcting unit 105 may be adapted not to perform the parallax adjustment on the edge of the subject region which have the generated distance information larger than a predetermined distance value.

Since a distant view generally has a poor stereoscopic effect and therefore the parallax adjustment for giving the roundness of backward curve to an edge of such a distant view as a mountain or a cloud produces an unnatural stereoscopic image. On the condition that the image correcting unit 105 is adapted not to perform the parallax adjustment on a distant subject which is at a predetermined distance or farther from the a capturing position but to perform the parallax adjustment only on a subject close to the capturing position, a more natural stereoscopic effect can be given to the image.

Further, in the aforementioned embodiments, the acquiring unit may include the first imaging unit 101 and the second imaging unit 102 which capture the stereoscopic view image, and the stereoscopic imaging apparatus 100 may further include the distance acquiring unit 401 operable to measure a distance to the subject in capturing the subject, and the region extracting unit 104 may extract the subject region from the acquired stereoscopic view image based on the measured distance to the subject.

As a result, from the distance information based on an actual range value to the subject in taking the stereoscopic view images, the subject regions can be extracted.

Further, in the aforementioned embodiments, the image correcting unit 105 may be adapted not to perform the parallax adjustment on the edge of the subject region corresponding to the subject which have the measured distance larger than a predetermined distance value.

A distant view generally has a poor stereoscopic effect, therefore, when the parallax adjustment for giving the roundness of backward curve is performed on an edge of such a distant view as a mountain or a cloud, an unnatural stereoscopic image is produced. On the condition that the image correcting unit 105 is adapted not to perform the parallax adjustment on a distant subject which is at a predetermined distance or farther from the capturing position but to perform the parallax adjustment only on a subject close to the capturing position, a more natural stereoscopic effect can be given to the image.

Further, in the aforementioned embodiments, the image correcting unit 105 may be adapted not to perform the parallax adjustment on the edge of a part of the extracted subject region, the length of which perpendicular to the parallax direction is a predetermined value or less.

Generally, most objects which are short in the vertical direction and long in the horizontal direction (typical parallax direction) may have a little thickness in fact. Therefore, when the parallax adjustment for giving the roundness of backward curve is performed on edges of all parts of the subject regions, an unnatural stereoscopic image may be produced. On the condition that the image correcting unit 105 is adapted not to perform the parallax adjustment on a part of the extracted subject regions, the length of which in the vertical direction (in the direction perpendicular to a direction of the parallax) is a predetermined value or less but to perform the parallax adjustment only on a part which has an enough length in the vertical direction, a more natural stereoscopic effect can be given to the image.

<6. Other Embodiments>

As described above, the first to fourth embodiments have been discussed as examples of the technology disclosed in the present application. However, the technology in the present disclosure is not limited to the above described embodiments and may also be applied to embodiments which have been subjected to modifications, substitutions, additions, and omissions as required. In addition, the respective constituent elements described in the first to fourth embodiments may be combined to make a new embodiment. Then, other embodiments will be exemplified below.

In the above described embodiments, the respective functional blocks may be made into separate chips by semiconductor devices such as LSI circuits or may be made into a single chip to include some or all of the functional blocks. Although LSI is used to exemplify the semiconductor device here, the semiconductor device may be referred to as IC, system LSI, super LSI, or ultra LSI according to the integration density.

Further, the technique of making the above described constituent elements into an integrated circuit is not limited to LSI, and the integrated circuit may be implemented by a dedicated circuit or a general purpose processor. An FPGA (Field Programmable Gate Array) which is an LSI capable of being programmed after manufacturing or a reconfigurable processor which is capable of reconfiguring connection and configuration of the circuit cells inside the LSI may be used.

Furthermore, when a new technology to make the functional blocks into an integrated circuit is developed to replace the LSI as advancement or derivation of the semiconductor technology, the new technology may be used in making the functional blocks into an integrated circuit. For example, application of biotechnology may be possible.

Alternatively, some or all of the functional blocks of the above described embodiments may be implemented by a program. Then, some or all of the processes of the functional blocks of the above described embodiments are executed by a central processing unit (CPU) of a computer. The program for performing each of the processes is stored in a storage device such as a hard disk or a ROM to be executed in the ROM or to be read out into a RAM and executed.

For example, in the case where the embodiments are implemented as the stereoscopic image processing program, the stereoscopic image processing program is a program for causing a computer to operate as a stereoscopic image processing apparatus, wherein the program causes a control unit of the computer to perform: extracting a subject region which represents a stereoscopic image of a specific subject from a stereoscopic view image which include a left eye image and a right eye image, the stereoscopic view image representing the stereoscopic image by means of parallax between the left eye image and the right eye image; calculating a length of the extracted subject region in a parallax direction; and adjusting parallax at an edge of the subject region based on the calculated length of the subject region in the parallax direction.

Further, in the above described stereoscopic image processing program, the parallax at the edge of the subject region may be adjusted to bring a localization position of the stereoscopic image at the edge of the subject region farther as the calculated length of the subject regions in the parallax direction is longer.

Each process of the aforementioned embodiments may be implemented by hardware, or may be implemented by software (including the case where the processes are implemented by an OS (operating system), middleware, or with a predetermined library). Further, each process may be implemented by cooperative processing of software and hardware.

In the case where the apparatus according to the above described embodiments is implemented by hardware, it is needless to say that timing adjustment for performing the respective processes is desired. In the aforementioned embodiments, details of timing adjustment for the respective signals caused in the actual hardware configuration are omitted for convenience of description.

The order of executing the processes in the aforementioned embodiments is not limited to the description of the embodiments and may be changed without departing from the spirit of the present disclosure.

A computer program for causing a computer to execute the above described method and a non-transitory computer readable recording medium which records the computer program are within the range of the present disclosure. The non-transitory computer readable recording medium may be a flexible disk, a hard disk, a CD-ROM, an MO, a DVD, a DVD-ROM, a DVD-RAM, a BD (Blu-ray Disc), and a semiconductor memory, for example.

The above described computer program is not limited to a program recorded in the above described non-transitory recording medium and may be transmitted over a telecommunication circuit, a wireless or wired communication circuit, or a network represented as the Internet.

In the aforementioned embodiments, a case where two imaging units acquire (capture) stereo images (the left eye image and the right eye image) as the stereoscopic view images has been described. However, the acquiring method of the stereoscopic view images is not limited to the above description, and a single imaging device may alternately acquire the left eye image and the right eye image or an imaging surface of a single imaging device may be divided into halves to acquire the left eye image and the right eye image respectively, for example. Alternatively, stereo images may be acquired from images (multi-viewpoint images) captured by two or more imaging units.

Yet alternatively, the stereoscopic view images (data are included) may be acquired as given images input from an external apparatus.

In the aforementioned embodiments, the respective processes of the parallax adjustment have been described by taking an example of the case where the photographic scene 1000 including the foreground 1002 (the main subject) and the background 1001 (see FIG. 4) is captured.

However, in the case where a plurality of foregrounds (subjects) are contained in the stereoscopic view images unlike the above described example, the stereoscopic image processing apparatus may be adapted to perform the parallax adjustment on the boundary (the edge of the subject region) between each subject and a subject farther from the imaging apparatus (capturing position, camera station) than the former subject is or the background, while not performing the parallax adjustment on the boundary (the edge of the subject region) between each subject and a subject closer to the imaging apparatus (capturing position, camera station) than the former subject is. That is, for example based on the parallax information, the stereoscopic image processing apparatus may be adapted to perform the parallax adjustment on the boundary between each subject and a subject farther than the former subject or the background, while not performing the parallax adjustment on the boundary between each subject and a subject closer to the former subject.

As a result, a natural stereoscopic effect can be added to the stereoscopic view images even in the case where a plurality of subjects are crowded and overlapped with each other in the stereoscopic view images.

As described above, the embodiments have been described as examples of the technology in the present disclosure. For that purpose, the accompanying drawings and the detailed description have been provided. Therefore, the constituent elements shown and described in the accompanying drawings and the detailed description may include not only the constituent element necessary to solve the problem but also the constituent element unnecessary to solve the problem for the purpose of exemplifying the above described technology. Accordingly, it should not be instantly understood that the unnecessary constituent element is necessary since the unnecessary constituent element is shown or described in the accompanying drawings and the detailed description.

Further, since the above described embodiments are for exemplifying the technology of the present disclosure, various changes, substitutions, additions, omissions and the like may be performed on the embodiments without departing from the scope of the claims and the equivalent of the claims.

The stereoscopic image processing apparatus, the stereoscopic image processing method, and the stereoscopic image processing program according to the present disclosure are useful in the fields related with stereoscopic view images (stereoscopic image) and can be applied to wide range of appliances which handle stereoscopic view images (stereoscopic image) such as a camera (imaging apparatus) for taking stereoscopic images, a display device for displaying stereoscopic view images (stereoscopic image), and image processing apparatuses for processing stereoscopic view images (stereoscopic image).

What is claimed is:

1. A stereoscopic image processing apparatus comprising:
an input interface configured to acquire an input stereoscopic image including an input left eye image and an input right eye image, the input left eye image and the input right eye image having first parallax in a first parallax direction and including a subject; and
an output interface configured to output an output stereoscopic image including an output left eye image and an output right eye image, the output left eye image being based on the input left eye image, the output right eye image being based on the input right eye image, the output left eye image and the output right eye image having second parallax in a second parallax direction and including the subject, wherein
when the subject in the input stereoscopic image has a first width in the first parallax direction, each of first edge areas of the subject is given a first depth in the second parallax in the output stereoscopic image, wherein the first edge areas of the subject in the output stereoscopic image are aligned in the second parallax direction, and
when the subject in the input stereoscopic image has a second width larger than the first width in the first parallax direction, each of second edge areas of the subject is given a second depth in the second parallax in the output stereoscopic image, the second depth being deeper than the first depth, wherein the second edge areas of the subject in the output stereoscopic image are aligned in the second parallax direction.

2. The stereoscopic image processing apparatus according to claim 1, further comprising a processor, wherein the processor is configured to:
when the subject in the input stereoscopic image has the first width in the first parallax direction, give each of the first edge areas of the subject the first depth in the second parallax in the output stereoscopic image, and align the first edge areas of the subject in the second parallax direction in the output stereoscopic image; and
when the subject in the input stereoscopic image has the second width larger than the first width in the first parallax direction, give each of second edge areas of the subject the second depth in the second parallax in the output stereoscopic image, and align the second edge areas of the subject in the second parallax direction in the output stereoscopic image.

3. The stereoscopic image processing apparatus according to claim 1, wherein
the input interface comprises a first camera configured to acquire the input left eye image, and a second camera configured to acquire the input right eye image.

4. The stereoscopic image processing apparatus according to claim 1, wherein
each of the input left eye image and the input right eye image has a first rectangular shape,
the first parallax direction extends in a long side direction of the first rectangular shape,
each of the output left eye image and the output right eye image has a second rectangular shape, and
the second parallax direction extends in a long side direction of the second rectangular shape.

5. The stereoscopic image processing apparatus according to claim 4, wherein
the first rectangular shape is equal to the second rectangular shape.

6. The stereoscopic image processing apparatus according to claim 1, wherein
the subject in the output stereoscopic image has a contour, and
each of the second edge areas of the subject is located adjacent to the contour within the contour.

7. The stereoscopic image processing apparatus according to claim 1, wherein
the subject has attributes of a figure of a person.

8. The stereoscopic image processing apparatus according to claim 1, wherein
when the subject in the input stereoscopic image has a third width larger than the second width in the first parallax direction, each of the second edge areas of the subject is given a third depth in the output stereoscopic image, the third depth being shallower than the second depth.

9. The stereoscopic image processing apparatus according to claim 8, wherein
the third depth is deeper than the first depth.

10. The stereoscopic image processing apparatus according to claim 8, wherein
the third depth is equal to the first depth.

11. A stereoscopic image processing method, for a stereoscopic image processing apparatus comprising: an input interface configured to acquire an input stereoscopic image including an input left eye image and an input right eye image, the input left eye image and the input right eye image having first parallax in a first parallax direction and including a subject; and an output interface configured to output an output stereoscopic image including an output left eye image and an output right eye image, the output left eye image being based on the input left eye image, the output right eye image being based on the input right eye image, the output left eye image and the output right eye image having second parallax in a second parallax direction and including the subject, the stereoscopic image processing method comprising:

when the subject in the input stereoscopic image has the first width in the first parallax direction, giving each of the first edge areas of the subject the first depth in the second parallax in the output stereoscopic image, and aligning the first edge areas of the subject in the second parallax direction in the output stereoscopic image; and when the subject in the input stereoscopic image has the second width larger than the first width in the first parallax direction, giving each of second edge areas of the subject the second depth in the second parallax in the output stereoscopic image, and aligning the second edge areas of the subject in the second parallax direction in the output stereoscopic image.

12. The stereoscopic image processing method according to claim 11, wherein
the input interface comprises a first camera configured to acquire the input left eye image, and a second camera configured to acquire the input right eye image.

13. The stereoscopic image processing method according to claim 11, wherein
each of the input left eye image and the input right eye image has a first rectangular shape,
the first parallax direction extends in a long side direction of the first rectangular shape,
each of the output left eye image and the output right eye image has a second rectangular shape, and
the second parallax direction extends in a long side direction of the second rectangular shape.

14. The stereoscopic image processing method according to claim 13, wherein
the first rectangular shape is equal to the second rectangular shape.

15. The stereoscopic image processing method according to claim 11, wherein
the subject in the output stereoscopic image has a contour, and
each of the second edge areas of the subject is located adjacent to the contour within the contour.

16. The stereoscopic image processing method according to claim 11, wherein
the subject has attributes of a figure of a person.

17. The stereoscopic image processing method according to claim 11, wherein
when the subject in the input stereoscopic image has a third width larger than the second width in the first parallax direction, each of second edge areas of the subject is given a third depth in the second parallax in the output stereoscopic image, the third depth being shallower than the second depth.

18. The stereoscopic image processing method according to claim 17, wherein
the third depth is deeper than the first depth.

19. The stereoscopic image processing method according to claim 17, wherein
the third depth is equal to the first depth.

* * * * *